United States Patent
Donnelly et al.

(10) Patent No.: US 8,866,334 B2
(45) Date of Patent: Oct. 21, 2014

(54) DISPATCHABLE POWER FROM A RENEWABLE ENERGY FACILITY

(75) Inventors: Frank Wegner Donnelly, North Vancouver (CA); David William Dewis, North Hampton, NH (US)

(73) Assignee: ICR Turbine Engine Corporation, Hampton, NH (US)

( * ) Notice: Subject to any disclaimer, the term of this patent is extended or adjusted under 35 U.S.C. 154(b) by 711 days.

(21) Appl. No.: 13/039,088

(22) Filed: Mar. 2, 2011

(65) Prior Publication Data

US 2011/0215640 A1 Sep. 8, 2011

Related U.S. Application Data

(60) Provisional application No. 61/309,716, filed on Mar. 2, 2010, provisional application No. 61/371,501, filed on Aug. 6, 2010, provisional application No. 61/422,970, filed on Dec. 14, 2010.

(51) Int. Cl.
*H02J 1/12* (2006.01)
*H02J 3/38* (2006.01)
*H02J 1/10* (2006.01)

(52) U.S. Cl.
CPC .................. *H02J 1/10* (2013.01); *Y02E 10/563* (2013.01); *H02J 3/383* (2013.01)
USPC ............... 307/21; 307/39; 307/22; 307/40; 307/42; 307/36; 290/44; 290/2; 290/43; 290/52; 323/268; 323/234; 700/295

(58) Field of Classification Search
USPC ........ 307/21, 64, 72, 31, 57, 112, 77; 290/44, 290/2; 322/37, 20–21, 36; 220/734
See application file for complete search history.

(56) References Cited

U.S. PATENT DOCUMENTS

| | | | |
|---|---|---|---|
| 2,463,964 | A | 3/1949 | Graf |
| 2,543,677 | A | 2/1951 | Traupel |
| 2,696,711 | A | 12/1954 | Marchant et al. |
| 2,711,071 | A | 6/1955 | Frankel |
| 3,032,987 | A | 5/1962 | Taylor |

(Continued)

FOREIGN PATENT DOCUMENTS

| | | |
|---|---|---|
| AT | 311027 | 12/2005 |
| AU | 582981 | 4/1989 |

(Continued)

OTHER PUBLICATIONS

U.S. Appl. No. 13/215,026, filed Aug. 22, 2011, Donnelly et al.

(Continued)

*Primary Examiner* — Jared Fureman
*Assistant Examiner* — Jagdeep Dhillon
(74) *Attorney, Agent, or Firm* — Sheridan Ross P.C.

(57) ABSTRACT

The placement of fully available prime movers having a DC output at a location inside or adjacent to an inverter-based intermittently available renewable energy site is disclosed. The fully available prime movers add reliability to an unreliable energy asset that is reaching its maximum penetration within the grid due to its unpredictability and the requirement for additional spinning reserves in other parts of the grid. The present invention can provide a portion or all of the power to an intermittently available renewable power generating facility so that the power output to the power grid is dispatchable power. In particular, a method and means are disclosed to utilize high-efficiency engines operated on various fuels some of which may be non-fossil fuels to maintain a constant power output from an otherwise intermittent power generating facility.

37 Claims, 15 Drawing Sheets

(56) References Cited

U.S. PATENT DOCUMENTS

| | | |
|---|---|---|
| 3,091,933 A | 6/1963 | Wagner et al. |
| 3,166,902 A | 1/1965 | Maljanian et al. |
| 3,209,536 A | 10/1965 | Howes et al. |
| 3,237,404 A | 3/1966 | Flanigan et al. |
| 3,319,931 A | 5/1967 | Bell, III |
| 3,518,472 A | 6/1970 | O'Callaghan |
| 3,639,076 A | 2/1972 | Rowen |
| 3,646,753 A | 3/1972 | Stearns et al. |
| 3,660,977 A | 5/1972 | Reynolds |
| 3,706,203 A | 12/1972 | Goldberg et al. |
| 3,729,928 A | 5/1973 | Rowen |
| 3,748,491 A | 7/1973 | Barrigher et al. |
| 3,764,814 A | 10/1973 | Griffith |
| 3,766,732 A | 10/1973 | Woodcock |
| 3,817,343 A | 6/1974 | Albrecht |
| 3,848,636 A | 11/1974 | McCombs |
| 3,866,108 A | 2/1975 | Yannone et al. |
| 3,888,337 A | 6/1975 | Worthen et al. |
| 3,893,293 A | 7/1975 | Moore |
| 3,937,588 A | 2/1976 | Kisslan |
| 3,939,653 A | 2/1976 | Schirmer |
| 3,945,199 A | 3/1976 | Bradley et al. |
| 3,953,967 A | 5/1976 | Smith |
| 3,964,253 A | 6/1976 | Paduch et al. |
| 3,977,183 A | 8/1976 | Stearns |
| 3,986,364 A | 10/1976 | Cronin et al. |
| 3,986,575 A | 10/1976 | Eggmann |
| 3,999,373 A | 12/1976 | Bell et al. |
| 3,999,375 A | 12/1976 | Smith et al. |
| 4,002,058 A | 1/1977 | Wolfinger |
| 4,005,946 A | 2/1977 | Brown et al. |
| 4,027,472 A | 6/1977 | Stearns |
| 4,027,473 A | 6/1977 | Baker |
| 4,056,019 A | 11/1977 | Ahlen |
| 4,059,770 A | 11/1977 | Mackay |
| 4,082,115 A | 4/1978 | Gibb et al. |
| 4,122,668 A | 10/1978 | Chou et al. |
| 4,242,042 A | 12/1980 | Schwarz |
| 4,242,871 A | 1/1981 | Breton |
| 4,248,040 A | 2/1981 | Kast |
| 4,270,357 A | 6/1981 | Rossi et al. |
| 4,276,744 A | 7/1981 | Pisano |
| 4,277,938 A | 7/1981 | Belke et al. |
| 4,280,327 A | 7/1981 | Mackay |
| 4,282,948 A | 8/1981 | Jerome |
| 4,312,191 A | 1/1982 | Biagini |
| 4,336,856 A | 6/1982 | Gamell |
| 4,399,651 A | 8/1983 | Geary et al. |
| 4,411,595 A | 10/1983 | Pisano |
| 4,449,359 A | 5/1984 | Cole et al. |
| 4,467,607 A | 8/1984 | Rydquist et al. |
| 4,470,261 A | 9/1984 | Kronogard et al. |
| 4,474,007 A | 10/1984 | Kronogard et al. |
| 4,492,874 A | 1/1985 | Near |
| 4,494,372 A | 1/1985 | Cronin |
| 4,499,756 A | 2/1985 | Medeiros et al. |
| 4,509,333 A | 4/1985 | Nussdorfer et al. |
| 4,529,887 A | 7/1985 | Johnson |
| 4,754,607 A | 7/1988 | Mackay |
| 4,783,957 A | 11/1988 | Harris |
| 4,815,278 A | 3/1989 | White |
| 4,819,436 A | 4/1989 | Ahner et al. |
| 4,858,428 A | 8/1989 | Paul |
| 4,864,811 A | 9/1989 | Pfefferle |
| 5,010,729 A | 4/1991 | Adamson et al. |
| 5,036,267 A | 7/1991 | Markunas et al. |
| 5,069,032 A | 12/1991 | White |
| 5,081,832 A | 1/1992 | Mowill |
| 5,083,039 A | 1/1992 | Richardson et al. |
| 5,090,193 A | 2/1992 | Schwarz et al. |
| 5,097,658 A | 3/1992 | Klaass et al. |
| 5,113,669 A | 5/1992 | Coffinberry |
| 5,129,222 A | 7/1992 | Lampe et al. |
| 5,144,299 A | 9/1992 | Smith |
| 5,214,910 A | 6/1993 | Adair |
| 5,231,822 A | 8/1993 | Shekleton |
| 5,253,470 A | 10/1993 | Newton |
| 5,276,353 A | 1/1994 | Kobayashi et al. |
| 5,301,500 A | 4/1994 | Hines |
| 5,329,757 A | 7/1994 | Faulkner et al. |
| 5,333,989 A | 8/1994 | Missana et al. |
| 5,343,692 A | 9/1994 | Thomson et al. |
| 5,349,814 A | 9/1994 | Ciokajlo et al. |
| 5,386,688 A | 2/1995 | Nakhamkin |
| 5,427,455 A | 6/1995 | Bosley |
| 5,448,889 A | 9/1995 | Bronicki |
| 5,450,724 A | 9/1995 | Kesseli et al. |
| 5,488,823 A | 2/1996 | Faulkner et al. |
| 5,497,615 A | 3/1996 | Noe et al. |
| 5,529,398 A | 6/1996 | Bosley |
| 5,549,174 A | 8/1996 | Reis |
| 5,555,719 A | 9/1996 | Rowen et al. |
| 5,564,270 A | 10/1996 | Kesseli et al. |
| 5,586,429 A | 12/1996 | Kesseli et al. |
| 5,609,655 A | 3/1997 | Kesseli et al. |
| 5,610,962 A | 3/1997 | Solorzano et al. |
| 5,685,156 A | 11/1997 | Willis et al. |
| 5,697,848 A | 12/1997 | Bosley |
| 5,722,259 A | 3/1998 | Sorensen et al. |
| 5,742,515 A | 4/1998 | Runkle et al. |
| 5,752,380 A | 5/1998 | Bosley et al. |
| 5,784,268 A | 7/1998 | Steffek et al. |
| 5,791,868 A | 8/1998 | Bosley et al. |
| 5,819,524 A | 10/1998 | Bosley et al. |
| 5,820,074 A | 10/1998 | Trommer et al. |
| 5,827,040 A | 10/1998 | Bosley et al. |
| 5,850,732 A | 12/1998 | Willis et al. |
| 5,850,733 A | 12/1998 | Bosley et al. |
| 5,873,235 A | 2/1999 | Bosley et al. |
| 5,894,720 A | 4/1999 | Willis et al. |
| 5,899,673 A | 5/1999 | Bosley et al. |
| 5,903,116 A | 5/1999 | Geis et al. |
| 5,915,841 A | 6/1999 | Weissert |
| 5,918,985 A | 7/1999 | Bosley |
| 5,928,301 A | 7/1999 | Soga et al. |
| 5,929,538 A | 7/1999 | O'Sullivan et al. |
| 5,954,174 A | 9/1999 | Costin |
| 5,964,663 A | 10/1999 | Stewart et al. |
| 5,966,926 A | 10/1999 | Shekleton et al. |
| 5,983,992 A | 11/1999 | Child et al. |
| 5,992,139 A | 11/1999 | Kesseli |
| 6,002,603 A | 12/1999 | Carver |
| 6,011,377 A | 1/2000 | Heglund et al. |
| 6,016,658 A | 1/2000 | Willis et al. |
| 6,020,713 A | 2/2000 | Geis et al. |
| 6,023,135 A | 2/2000 | Gilbreth et al. |
| 6,031,294 A | 2/2000 | Geis et al. |
| 6,037,687 A | 3/2000 | Stewart et al. |
| 6,049,195 A | 4/2000 | Geis et al. |
| 6,062,016 A | 5/2000 | Edelman |
| 6,065,281 A | 5/2000 | Shekleton et al. |
| 6,070,404 A | 6/2000 | Bosley et al. |
| 6,082,112 A | 7/2000 | Shekleton |
| 6,085,524 A | 7/2000 | Persson |
| 6,093,975 A | 7/2000 | Peticolas |
| 6,094,799 A | 8/2000 | Stewart et al. |
| 6,107,693 A | 8/2000 | Mongia et al. |
| 6,138,781 A | 10/2000 | Hakala |
| D433,997 S | 11/2000 | Laituri et al. |
| 6,141,953 A | 11/2000 | Mongia et al. |
| 6,155,076 A | 12/2000 | Cullen et al. |
| 6,155,780 A | 12/2000 | Rouse |
| 6,158,892 A | 12/2000 | Stewart et al. |
| 6,169,334 B1 | 1/2001 | Edelman |
| 6,170,251 B1 | 1/2001 | Skowronski et al. |
| 6,178,751 B1 | 1/2001 | Shekleton et al. |
| 6,190,048 B1 | 2/2001 | Weissert |
| 6,192,668 B1 | 2/2001 | Mackay |
| 6,194,794 B1 | 2/2001 | Lampe et al. |
| 6,205,765 B1 | 3/2001 | Iasillo et al. |
| 6,205,768 B1 | 3/2001 | Dibble et al. |
| 6,213,234 B1 | 4/2001 | Rosen et al. |
| 6,239,520 B1 | 5/2001 | Stahl et al. |
| 6,265,786 B1 | 7/2001 | Bosley et al. |

(56) References Cited

U.S. PATENT DOCUMENTS

| | | |
|---|---|---|
| 6,274,945 B1 | 8/2001 | Gilbreth et al. |
| 6,281,596 B1 | 8/2001 | Gilbreth et al. |
| 6,281,601 B1 | 8/2001 | Edelmanet et al. |
| 6,305,079 B1 | 10/2001 | Child et al. |
| 6,314,717 B1 | 11/2001 | Teets et al. |
| 6,316,841 B1 | 11/2001 | Weber |
| 6,324,828 B1 | 12/2001 | Willis et al. |
| 6,324,846 B1 | 12/2001 | Clarke |
| 6,325,142 B1 | 12/2001 | Bosley et al. |
| 6,349,787 B1 | 2/2002 | Dakhil |
| 6,355,987 B1 | 3/2002 | Bixel |
| 6,361,271 B1 | 3/2002 | Bosley |
| 6,381,944 B2 | 5/2002 | Mackay |
| 6,405,522 B1 | 6/2002 | Pont et al. |
| 6,410,992 B1 | 6/2002 | Wall et al. |
| 6,425,732 B1 | 7/2002 | Rouse et al. |
| 6,437,468 B2 | 8/2002 | Stahl et al. |
| 6,438,936 B1 | 8/2002 | Ryan |
| 6,438,937 B1 | 8/2002 | Pont et al. |
| 6,453,658 B1 | 9/2002 | Willis et al. |
| 6,468,051 B2 | 10/2002 | Lampe et al. |
| 6,487,096 B1 | 11/2002 | Gilbreth et al. |
| 6,489,692 B1 | 12/2002 | Gilbreth et al. |
| 6,495,929 B2 | 12/2002 | Bosley et al. |
| 6,499,949 B2 | 12/2002 | Schafrik et al. |
| 6,522,030 B1 | 2/2003 | Wall et al. |
| 6,526,757 B2 | 3/2003 | MacKay |
| 6,539,720 B2 | 4/2003 | Rouse et al. |
| 6,542,791 B1 * | 4/2003 | Perez .......................... 700/295 |
| 6,543,232 B1 | 4/2003 | Anderson et al. |
| 6,552,440 B2 | 4/2003 | Gilbreth et al. |
| 6,574,950 B2 | 6/2003 | Nash |
| 6,598,400 B2 | 7/2003 | Nash et al. |
| 6,601,392 B2 | 8/2003 | Child |
| 6,605,928 B2 | 8/2003 | Gupta et al. |
| 6,606,864 B2 | 8/2003 | Mackay |
| 6,612,112 B2 | 9/2003 | Gilbreth et al. |
| 6,629,064 B1 | 9/2003 | Wall |
| 6,634,176 B2 | 10/2003 | Rouse et al. |
| 6,639,328 B2 | 10/2003 | Wacknov |
| 6,644,916 B1 | 11/2003 | Beacom |
| RE38,373 E | 12/2003 | Bosley |
| 6,657,332 B2 | 12/2003 | Balas |
| 6,657,348 B2 | 12/2003 | Qin et al. |
| 6,663,044 B1 | 12/2003 | Munoz et al. |
| 6,664,653 B1 | 12/2003 | Edelman |
| 6,664,654 B2 | 12/2003 | Wall et al. |
| 6,670,721 B2 * | 12/2003 | Lof et al. .................... 290/44 |
| 6,675,583 B2 | 1/2004 | Willis et al. |
| 6,683,389 B2 | 1/2004 | Geis |
| 6,684,642 B2 | 2/2004 | Willis et al. |
| 6,698,208 B2 | 3/2004 | Teets |
| 6,698,554 B2 | 3/2004 | Desta et al. |
| 6,702,463 B1 | 3/2004 | Brockett et al. |
| 6,709,243 B1 | 3/2004 | Tan et al. |
| 6,713,892 B2 | 3/2004 | Gilbreth et al. |
| 6,720,685 B2 | 4/2004 | Balas |
| 6,729,141 B2 | 5/2004 | Ingram |
| 6,732,531 B2 | 5/2004 | Dickey |
| 6,735,951 B2 | 5/2004 | Thompson |
| 6,745,574 B1 | 6/2004 | Dettmer |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,766,647 B2 | 7/2004 | Hartzheim |
| 6,784,565 B2 | 8/2004 | Wall et al. |
| 6,787,933 B2 | 9/2004 | Claude et al. |
| 6,794,766 B2 | 9/2004 | Wickert et al. |
| 6,796,527 B1 | 9/2004 | Munoz et al. |
| 6,804,946 B2 | 10/2004 | Willis et al. |
| 6,810,677 B2 | 11/2004 | Dewis |
| 6,812,586 B2 | 11/2004 | Wacknov et al. |
| 6,812,587 B2 | 11/2004 | Gilbreth et al. |
| 6,815,932 B2 | 11/2004 | Wall |
| 6,817,575 B1 | 11/2004 | Munoz et al. |
| 6,819,999 B2 | 11/2004 | Hartzheim |
| 6,823,675 B2 | 11/2004 | Brunell et al. |
| 6,829,899 B2 | 12/2004 | Benham, Jr. et al. |
| 6,832,470 B2 | 12/2004 | Dewis |
| 6,834,226 B2 | 12/2004 | Hartzheim |
| 6,836,720 B2 | 12/2004 | Hartzheim |
| 6,837,419 B2 | 1/2005 | Ryan |
| 6,845,558 B2 | 1/2005 | Beacom |
| 6,845,621 B2 | 1/2005 | Teets |
| 6,847,129 B2 | 1/2005 | McKelvey et al. |
| 6,847,194 B2 | 1/2005 | Sarlioglu et al. |
| 6,848,249 B2 | 2/2005 | Coleman et al. |
| 6,863,509 B2 | 3/2005 | Dewis |
| 6,864,595 B2 | 3/2005 | Wall |
| 6,870,279 B2 | 3/2005 | Gilbreth et al. |
| 6,877,323 B2 | 4/2005 | Dewis |
| 6,883,331 B2 | 4/2005 | Jonsson et al. |
| 6,888,263 B2 | 5/2005 | Satoh et al. |
| 6,891,282 B2 | 5/2005 | Gupta et al. |
| 6,895,760 B2 | 5/2005 | Kesseli |
| 6,897,578 B1 | 5/2005 | Olsen et al. |
| 6,909,199 B2 | 6/2005 | Gupta et al. |
| 6,911,742 B2 | 6/2005 | Gupta et al. |
| 6,931,856 B2 | 8/2005 | Belokon et al. |
| 6,951,110 B2 | 10/2005 | Kang |
| 6,956,301 B2 | 10/2005 | Gupta et al. |
| 6,958,550 B2 | 10/2005 | Gilbreth et al. |
| 6,960,840 B2 | 11/2005 | Willis et al. |
| 6,964,168 B1 | 11/2005 | Pierson et al. |
| 6,966,173 B2 | 11/2005 | Dewis |
| 6,968,702 B2 | 11/2005 | Child et al. |
| 6,973,880 B2 | 12/2005 | Kumar |
| 6,977,446 B2 | 12/2005 | Mackay |
| 6,979,914 B2 | 12/2005 | McKelvey et al. |
| 6,989,610 B2 | 1/2006 | Gupta et al. |
| 6,998,728 B2 | 2/2006 | Gupta et al. |
| 7,053,590 B2 | 5/2006 | Wang |
| 7,065,873 B2 | 6/2006 | Kang et al. |
| RE39,190 E | 7/2006 | Weissert |
| 7,092,262 B2 | 8/2006 | Ryan et al. |
| 7,093,443 B2 | 8/2006 | McKelvey et al. |
| 7,112,036 B2 | 9/2006 | Lubell et al. |
| 7,117,683 B2 | 10/2006 | Thompson |
| 7,147,050 B2 | 12/2006 | Kang et al. |
| 7,166,928 B2 | 1/2007 | Larsen |
| 7,181,337 B2 | 2/2007 | Kosaka |
| 7,185,496 B2 | 3/2007 | Herlihy |
| 7,186,200 B1 | 3/2007 | Hauser |
| 7,211,906 B2 | 5/2007 | Teets et al. |
| 7,224,081 B2 | 5/2007 | Larsen |
| 7,244,524 B2 | 7/2007 | McCluskey et al. |
| 7,266,429 B2 | 9/2007 | Travaly et al. |
| 7,274,111 B2 | 9/2007 | Andrew et al. |
| 7,285,871 B2 | 10/2007 | Derouineau |
| 7,299,638 B2 | 11/2007 | Mackay |
| 7,304,445 B2 | 12/2007 | Donnelly |
| 7,309,929 B2 | 12/2007 | Donnelly et al. |
| 7,318,154 B2 | 1/2008 | Tehee |
| 7,325,401 B1 | 2/2008 | Kesseli et al. |
| 7,343,744 B2 | 3/2008 | Abelson et al. |
| 7,393,179 B1 | 7/2008 | Kesseli et al. |
| 7,398,642 B2 | 7/2008 | McQuiggan |
| 7,404,294 B2 | 7/2008 | Sundin |
| 7,415,764 B2 | 8/2008 | Kang et al. |
| 7,423,412 B2 | 9/2008 | Weng et al. |
| 7,464,533 B2 | 12/2008 | Wollenweber |
| 7,513,120 B2 | 4/2009 | Kupratis |
| 7,514,807 B2 | 4/2009 | Donnelly et al. |
| 7,518,254 B2 | 4/2009 | Donnelly et al. |
| RE40,713 E | 5/2009 | Geis et al. |
| 7,554,278 B2 | 6/2009 | Wegner-Donnelly et al. |
| 7,565,867 B2 | 7/2009 | Donnelly et al. |
| 7,572,531 B2 | 8/2009 | Forte |
| 7,574,853 B2 | 8/2009 | Teets et al. |
| 7,574,867 B2 | 8/2009 | Teets et al. |
| 7,595,124 B2 | 9/2009 | Varatharajan et al. |
| 7,605,487 B2 | 10/2009 | Barton et al. |
| 7,605,498 B2 | 10/2009 | Ledenev et al. |
| 7,607,318 B2 | 10/2009 | Lui et al. |

(56) References Cited

U.S. PATENT DOCUMENTS

| | | | |
|---|---|---|---|
| 7,608,937 B1 | 10/2009 | Altenschulte | |
| 7,614,792 B2 | 11/2009 | Wade et al. | |
| 7,615,881 B2 | 11/2009 | Halsey et al. | |
| 7,617,687 B2 | 11/2009 | West et al. | |
| 7,656,135 B2 | 2/2010 | Schram et al. | |
| 7,667,347 B2 | 2/2010 | Donnelly et al. | |
| 7,671,481 B2 | 3/2010 | Miller et al. | |
| 7,766,790 B2 | 8/2010 | Stevenson et al. | |
| 7,770,376 B1 | 8/2010 | Brostmeyer | |
| 7,777,358 B2 | 8/2010 | Halsey et al. | |
| 7,804,184 B2 | 9/2010 | Yuan et al. | |
| 7,841,185 B2 | 11/2010 | Richards et al. | |
| 7,861,696 B2 | 1/2011 | Lund | |
| 7,866,532 B1 | 1/2011 | Potter et al. | |
| 7,906,862 B2 | 3/2011 | Donnelly et al. | |
| 7,921,944 B2 | 4/2011 | Russell et al. | |
| 7,926,274 B2 | 4/2011 | Farkaly | |
| 7,944,081 B2 | 5/2011 | Donnelly et al. | |
| 7,957,846 B2 | 6/2011 | Hakim et al. | |
| 7,966,868 B1 | 6/2011 | Sonnichsen et al. | |
| 8,008,808 B2* | 8/2011 | Seeker et al. | 307/72 |
| 8,015,812 B1 | 9/2011 | Kesseli et al. | |
| 8,046,990 B2 | 11/2011 | Bollinger et al. | |
| 8,188,693 B2 | 5/2012 | Wei et al. | |
| 8,244,419 B2 | 8/2012 | Wegner-Donnelly et al. | |
| 2001/0030425 A1 | 10/2001 | Gilbreth et al. | |
| 2001/0052704 A1 | 12/2001 | Bosley et al. | |
| 2002/0054718 A1 | 5/2002 | Weissert | |
| 2002/0063479 A1 | 5/2002 | Mitchell et al. | |
| 2002/0067872 A1 | 6/2002 | Weissert | |
| 2002/0073688 A1 | 6/2002 | Bosley et al. | |
| 2002/0073713 A1 | 6/2002 | Mackay | |
| 2002/0079760 A1 | 6/2002 | Vessa | |
| 2002/0083714 A1 | 7/2002 | Bakholdin | |
| 2002/0096393 A1 | 7/2002 | Rouse | |
| 2002/0096959 A1 | 7/2002 | Qin et al. | |
| 2002/0097928 A1 | 7/2002 | Swinton et al. | |
| 2002/0099476 A1 | 7/2002 | Hamrin et al. | |
| 2002/0103745 A1 | 8/2002 | Lof et al. | |
| 2002/0104316 A1 | 8/2002 | Dickey et al. | |
| 2002/0110450 A1 | 8/2002 | Swinton | |
| 2002/0119040 A1 | 8/2002 | Bosley | |
| 2002/0120368 A1 | 8/2002 | Edelman et al. | |
| 2002/0124569 A1 | 9/2002 | Treece et al. | |
| 2002/0128076 A1 | 9/2002 | Lubell | |
| 2002/0148229 A1 | 10/2002 | Pont et al. | |
| 2002/0149205 A1 | 10/2002 | Gilbreth et al. | |
| 2002/0149206 A1 | 10/2002 | Gilbreth et al. | |
| 2002/0157881 A1 | 10/2002 | Bakholdin et al. | |
| 2002/0158517 A1 | 10/2002 | Rouse et al. | |
| 2002/0166324 A1 | 11/2002 | Willis et al. | |
| 2003/0110773 A1 | 6/2003 | Rouse et al. | |
| 2004/0008010 A1 | 1/2004 | Ebrahim et al. | |
| 2004/0011038 A1 | 1/2004 | Stinger et al. | |
| 2004/0035656 A1 | 2/2004 | Anwar et al. | |
| 2004/0065293 A1 | 4/2004 | Goto | |
| 2004/0080165 A1 | 4/2004 | Geis et al. | |
| 2004/0090204 A1 | 5/2004 | McGinley | |
| 2004/0103669 A1 | 6/2004 | Willis et al. | |
| 2004/0106486 A1 | 6/2004 | Jonsson | |
| 2004/0119291 A1 | 6/2004 | Hamrin et al. | |
| 2004/0148942 A1 | 8/2004 | Pont et al. | |
| 2004/0160061 A1 | 8/2004 | Rouse et al. | |
| 2005/0000224 A1 | 1/2005 | Jonsson | |
| 2005/0103931 A1 | 5/2005 | Morris et al. | |
| 2005/0206331 A1 | 9/2005 | Donnelly | |
| 2005/0228553 A1 | 10/2005 | Tryon | |
| 2006/0076171 A1 | 4/2006 | Donnelly et al. | |
| 2006/0090109 A1 | 4/2006 | Bonnet | |
| 2007/0012129 A1 | 1/2007 | Maty et al. | |
| 2007/0068712 A1 | 3/2007 | Carnahan | |
| 2007/0178340 A1 | 8/2007 | Eickhoff | |
| 2007/0181294 A1 | 8/2007 | Soldner et al. | |
| 2007/0239325 A1 | 10/2007 | Regunath | |
| 2007/0290039 A1 | 12/2007 | Pfleging et al. | |
| 2008/0080682 A1 | 4/2008 | Ogunwale et al. | |
| 2008/0148708 A1 | 6/2008 | Chou et al. | |
| 2008/0197705 A1 | 8/2008 | Dewis et al. | |
| 2008/0243352 A1 | 10/2008 | Healy | |
| 2008/0278000 A1* | 11/2008 | Capp et al. | 307/21 |
| 2009/0045292 A1 | 2/2009 | Maddali et al. | |
| 2009/0071478 A1 | 3/2009 | Kalfon | |
| 2009/0090109 A1 | 4/2009 | Mills et al. | |
| 2009/0106978 A1 | 4/2009 | Wollenweber | |
| 2009/0109022 A1 | 4/2009 | Gangopadhyay et al. | |
| 2009/0158739 A1 | 6/2009 | Messmer | |
| 2009/0193809 A1 | 8/2009 | Schroder et al. | |
| 2009/0211260 A1 | 8/2009 | Kesseli et al. | |
| 2009/0211739 A1 | 8/2009 | Nash et al. | |
| 2009/0211740 A1 | 8/2009 | Kesseli et al. | |
| 2009/0249786 A1 | 10/2009 | Garrett et al. | |
| 2009/0271086 A1 | 10/2009 | Morris et al. | |
| 2009/0292436 A1 | 11/2009 | D'Amato et al. | |
| 2009/0313990 A1 | 12/2009 | Mustafa | |
| 2010/0021284 A1 | 1/2010 | Watson et al. | |
| 2010/0052425 A1 | 3/2010 | Moore et al. | |
| 2010/0127570 A1* | 5/2010 | Hadar et al. | 307/77 |
| 2010/0154380 A1 | 6/2010 | Tangirala et al. | |
| 2010/0229525 A1 | 9/2010 | Mackay et al. | |
| 2010/0288571 A1 | 11/2010 | Dewis et al. | |
| 2010/0293946 A1 | 11/2010 | Vick | |
| 2010/0301062 A1* | 12/2010 | Litwin et al. | 220/734 |
| 2010/0319355 A1 | 12/2010 | Prabhu | |
| 2011/0020108 A1 | 1/2011 | Axelsson et al. | |
| 2011/0100777 A1 | 5/2011 | Wilton et al. | |
| 2011/0288738 A1 | 11/2011 | Donnelly et al. | |
| 2011/0295453 A1 | 12/2011 | Betz et al. | |
| 2012/0000204 A1 | 1/2012 | Kesseli et al. | |
| 2012/0017598 A1 | 1/2012 | Kesseli et al. | |
| 2012/0042656 A1 | 2/2012 | Donnelly et al. | |
| 2012/0096869 A1 | 4/2012 | Kesseli et al. | |
| 2012/0102911 A1 | 5/2012 | Dewis et al. | |
| 2012/0175886 A1 | 7/2012 | Donnelly et al. | |
| 2012/0201657 A1 | 8/2012 | Donnelly et al. | |
| 2012/0260662 A1 | 10/2012 | Nash et al. | |
| 2012/0324903 A1 | 12/2012 | Dewis et al. | |
| 2013/0106110 A1 | 5/2013 | Marley, II | |
| 2013/0111923 A1 | 5/2013 | Donnelly et al. | |
| 2013/0133480 A1 | 5/2013 | Donnelly | |
| 2013/0139519 A1 | 6/2013 | Kesseli et al. | |
| 2013/0294892 A1 | 11/2013 | Dewis et al, | |
| 2013/0305730 A1 | 11/2013 | Donnelly et al. | |
| 2014/0000275 A1 | 1/2014 | Kesseli et al. | |
| 2014/0026585 A1 | 1/2014 | Baldwin | |

FOREIGN PATENT DOCUMENTS

| | | |
|---|---|---|
| AU | 587266 | 8/1989 |
| AU | 8517301 | 3/2002 |
| AU | 2025002 | 5/2002 |
| AU | 2589802 | 5/2002 |
| AU | 2004203836 | 3/2005 |
| AU | 2004208656 | 2/2009 |
| AU | 2004318142 | 6/2009 |
| CA | 1050637 | 3/1979 |
| CA | 1068492 | 12/1979 |
| CA | 1098997 | 4/1981 |
| CA | 1099373 | 4/1981 |
| CA | 1133263 | 10/1982 |
| CA | 1171671 | 7/1984 |
| CA | 1190050 | 7/1985 |
| CA | 1202099 | 3/1986 |
| CA | 1244661 | 11/1988 |
| CA | 1275719 | 10/1990 |
| CA | 2066258 | 3/1991 |
| CA | 1286882 | 7/1991 |
| CA | 2220172 | 5/1998 |
| CA | 2234318 | 10/1998 |
| CA | 2238356 | 3/1999 |
| CA | 2242947 | 3/1999 |
| CA | 2246769 | 3/1999 |
| CA | 2279320 | 4/2000 |
| CA | 2677758 | 4/2000 |
| CA | 2317855 | 5/2001 |

(56) References Cited

FOREIGN PATENT DOCUMENTS

| | | |
|---|---|---|
| CA | 2254034 | 6/2007 |
| CA | 2638648 | 2/2009 |
| CA | 2689188 | 7/2010 |
| CH | 595552 | 2/1978 |
| CH | 679235 | 1/1992 |
| CN | 1052170 | 6/1991 |
| CN | 1060270 | 4/1992 |
| CN | 1306603 | 8/2001 |
| CN | 1317634 | 10/2001 |
| CN | 1902389 | 1/2007 |
| CN | 101098079 | 1/2008 |
| CN | 100564811 | 12/2009 |
| CN | 101635449 | 1/2010 |
| CN | 101672252 | 3/2010 |
| CS | 9101996 | 1/1992 |
| CZ | 20014556 | 4/2003 |
| DE | 1272306 | 7/1968 |
| DE | 2753673 | 6/1978 |
| DE | 2853919 | 6/1979 |
| DE | 3140694 | 7/1982 |
| DE | 3736984 | 5/1988 |
| DE | 69519684 | 8/2001 |
| DE | 10305352 | 9/2004 |
| DE | 69828916 | 3/2006 |
| DE | 60125441 | 2/2007 |
| DE | 60125583 | 2/2007 |
| DK | 331889 | 7/1989 |
| EP | 0092551 | 11/1983 |
| EP | 0093118 | 11/1983 |
| EP | 0104921 | 4/1984 |
| EP | 0157794 | 10/1985 |
| EP | 0377292 | 7/1990 |
| EP | 0319246 | 10/1990 |
| EP | 0432753 | 6/1991 |
| EP | 0455640 | 11/1991 |
| EP | 0472294 | 2/1992 |
| EP | 0478713 | 4/1992 |
| EP | 0493481 | 7/1992 |
| EP | 0522832 | 1/1993 |
| EP | 0620906 | 10/1994 |
| EP | 0691511 | 1/1996 |
| EP | 0754142 | 1/1997 |
| EP | 0784156 | 12/1997 |
| EP | 0837224 | 4/1998 |
| EP | 0837231 | 4/1998 |
| EP | 0901218 | 3/1999 |
| EP | 0698178 | 6/1999 |
| EP | 0963035 | 12/1999 |
| EP | 1055809 | 11/2000 |
| EP | 1075724 | 2/2001 |
| EP | 1046786 | 1/2002 |
| EP | 1071185 | 1/2002 |
| EP | 1215393 | 6/2002 |
| EP | 0739087 | 8/2002 |
| EP | 1240713 | 9/2002 |
| EP | 1277267 | 1/2003 |
| EP | 1283166 | 2/2003 |
| EP | 1305210 | 5/2003 |
| EP | 1340301 | 9/2003 |
| EP | 1340304 | 9/2003 |
| EP | 1341990 | 9/2003 |
| EP | 1342044 | 9/2003 |
| EP | 1346139 | 9/2003 |
| EP | 1436504 | 7/2004 |
| EP | 1203866 | 8/2004 |
| EP | 0800616 | 12/2004 |
| EP | 1519011 | 3/2005 |
| EP | 1132614 | 1/2007 |
| EP | 1790568 | 5/2007 |
| EP | 1813807 | 8/2007 |
| EP | 1825115 | 8/2007 |
| EP | 1860750 | 11/2007 |
| EP | 1939396 | 7/2008 |
| EP | 2028104 | 2/2009 |
| EP | 1638184 | 3/2009 |
| EP | 1648096 | 7/2009 |
| EP | 2108828 | 10/2009 |
| EP | 1728990 | 11/2009 |
| EP | 2161444 | 3/2010 |
| EP | 2169800 | 3/2010 |
| EP | 1713141 | 5/2010 |
| EP | 1728304 | 6/2010 |
| EP | 1468180 | 7/2010 |
| FR | 2467286 | 11/1985 |
| FR | 2637942 | 4/1990 |
| FR | 2645908 | 10/1990 |
| FR | 2755319 | 4/1998 |
| FR | 2848647 | 6/2004 |
| GB | 612817 | 11/1948 |
| GB | 671379 | 5/1952 |
| GB | 673961 | 6/1952 |
| GB | 706743 | 4/1954 |
| GB | 731735 | 6/1955 |
| GB | 761955 | 11/1956 |
| GB | 768047 | 2/1957 |
| GB | 784119 | 10/1957 |
| GB | 786001 | 11/1957 |
| GB | 789589 | 1/1958 |
| GB | 807267 | 1/1959 |
| GB | 817507 | 7/1959 |
| GB | 834550 | 5/1960 |
| GB | 864712 | 4/1961 |
| GB | 874251 | 8/1961 |
| GB | 877838 | 9/1961 |
| GB | 878552 | 10/1961 |
| GB | 885184 | 12/1961 |
| GB | 917392 | 2/1963 |
| GB | 919540 | 2/1963 |
| GB | 920408 | 3/1963 |
| GB | 924078 | 4/1963 |
| GB | 931926 | 7/1963 |
| GB | 937278 | 9/1963 |
| GB | 937681 | 9/1963 |
| GB | 950015 | 2/1964 |
| GB | 950506 | 2/1964 |
| GB | 977402 | 12/1964 |
| GB | 993039 | 5/1965 |
| GB | 1004953 | 9/1965 |
| GB | 1008310 | 10/1965 |
| GB | 1009115 | 11/1965 |
| GB | 1012909 | 12/1965 |
| GB | 1043271 | 9/1966 |
| GB | 1083943 | 9/1967 |
| GB | 1097623 | 1/1968 |
| GB | 1103032 | 2/1968 |
| GB | 1127856 | 9/1968 |
| GB | 1137691 | 12/1968 |
| GB | 1138807 | 1/1969 |
| GB | 1141019 | 1/1969 |
| GB | 1148179 | 4/1969 |
| GB | 1158271 | 7/1969 |
| GB | 1172126 | 11/1969 |
| GB | 1174207 | 12/1969 |
| GB | 1211607 | 11/1970 |
| GB | 1270011 | 4/1972 |
| GB | 1275753 | 5/1972 |
| GB | 1275754 | 5/1972 |
| GB | 1275755 | 5/1972 |
| GB | 1301104 | 12/1972 |
| GB | 1348797 | 3/1974 |
| GB | 1392271 | 4/1975 |
| GB | 1454766 | 11/1976 |
| GB | 1460590 | 1/1977 |
| GB | 1516664 | 7/1978 |
| GB | 2019494 | 10/1979 |
| GB | 2074254 | 10/1981 |
| GB | 2089433 | 6/1982 |
| GB | 2123154 | 1/1984 |
| GB | 2174824 | 11/1986 |
| GB | 2184609 | 6/1987 |
| GB | 2199083 | 6/1988 |
| GB | 2211285 | 6/1989 |
| GB | 2218255 | 11/1989 |
| GB | 2232207 | 12/1990 |

(56) References Cited

FOREIGN PATENT DOCUMENTS

| | | |
|---|---|---|
| GB | 2341897 | 3/2000 |
| GB | 2355286 | 4/2001 |
| GB | 2420615 | 5/2006 |
| GB | 2426043 | 11/2006 |
| GB | 2435529 | 8/2007 |
| GB | 2436708 | 10/2007 |
| GB | 2441924 | 3/2008 |
| GB | 2442585 | 4/2008 |
| GB | 2456336 | 7/2009 |
| GB | 2456672 | 7/2009 |
| GB | 2447514 | 12/2009 |
| IN | 4946DELNP2006 | 8/2007 |
| IN | 4341DELNP2005 | 10/2007 |
| IN | 5879DELNP2008 | 9/2008 |
| IN | 2502DEL2005 | 10/2009 |
| IN | 1913DEL2009 | 6/2010 |
| IN | 55DEL2010 | 7/2010 |
| IN | 2013DEL2009 | 7/2010 |
| IT | 1173399 | 6/1987 |
| IT | 1194590 | 9/1988 |
| IT | MI911564 | 1/1992 |
| JP | 51-065252 | 6/1976 |
| JP | 56-088920 | 7/1981 |
| JP | 56-148624 | 11/1981 |
| JP | 56-148625 | 11/1981 |
| JP | 60-184973 | 9/1985 |
| JP | 61-182489 | 8/1986 |
| JP | 3182638 | 8/1991 |
| JP | 6201891 | 7/1994 |
| JP | 2519620 | 7/1996 |
| JP | 10-054561 | 2/1998 |
| JP | 10-061660 | 3/1998 |
| JP | 10-115229 | 5/1998 |
| JP | 10-122180 | 5/1998 |
| JP | 11-324727 | 11/1999 |
| JP | 2000-054855 | 2/2000 |
| JP | 2000-130319 | 5/2000 |
| JP | 2000-329096 | 11/2000 |
| JP | 2002-030942 | 1/2002 |
| JP | 2002-115565 | 4/2002 |
| JP | 2003-009593 | 1/2003 |
| JP | 2003-013744 | 1/2003 |
| JP | 2003-041906 | 2/2003 |
| JP | 2004-163087 | 6/2004 |
| JP | 2005-345095 | 12/2005 |
| JP | 2006-022811 | 1/2006 |
| JP | 2006-170208 | 6/2006 |
| JP | 2006-174694 | 6/2006 |
| JP | 2006-200438 | 8/2006 |
| JP | 2007-231949 | 9/2007 |
| JP | 2008-111438 | 5/2008 |
| JP | 2008-132973 | 6/2008 |
| JP | 2009-108756 | 5/2009 |
| JP | 2009-108860 | 5/2009 |
| JP | 2009-209931 | 9/2009 |
| JP | 2009-216085 | 9/2009 |
| JP | 2009-250040 | 10/2009 |
| JP | 2010-014114 | 1/2010 |
| JP | 2010-106835 | 5/2010 |
| KR | 19840002483 | 12/1984 |
| KR | 880002362 | 10/1988 |
| KR | 890001170 | 4/1989 |
| KR | 1020010007189 | 1/2001 |
| KR | 1020020024545 | 3/2002 |
| KR | 1020030032864 | 4/2003 |
| KR | 1020060096320 | 9/2006 |
| KR | 1020070078978 | 8/2007 |
| KR | 1020070113990 | 11/2007 |
| KR | 1020080033866 | 4/2008 |
| KR | 1020090121248 | 11/2009 |
| NL | 7903120 | 10/1979 |
| SE | 437543 | 3/1985 |
| SE | 9901718 | 5/1999 |
| SE | 0103180 | 3/2003 |
| WO | WO 8501326 | 3/1985 |
| WO | WO 9207221 | 4/1992 |
| WO | WO 9524072 | 9/1995 |
| WO | WO 9722176 | 6/1997 |
| WO | WO 9722789 | 6/1997 |
| WO | WO 9726491 | 7/1997 |
| WO | WO 9825014 | 6/1998 |
| WO | WO 9854448 | 12/1998 |
| WO | WO 9919161 | 4/1999 |
| WO | WO 0140644 | 6/2001 |
| WO | WO 0182448 | 11/2001 |
| WO | WO 0202920 | 1/2002 |
| WO | WO 0229225 | 4/2002 |
| WO | WO 0240844 | 5/2002 |
| WO | WO 0242611 | 5/2002 |
| WO | WO 0244574 | 6/2002 |
| WO | WO 0250618 | 6/2002 |
| WO | WO 02037638 | 9/2002 |
| WO | WO 0239045 | 2/2003 |
| WO | WO 03093652 | 11/2003 |
| WO | WO 2004077637 | 9/2004 |
| WO | WO 2005045345 | 5/2005 |
| WO | WO 2005099063 | 10/2005 |
| WO | WO 2008044972 | 4/2008 |
| WO | WO 2008044973 | 4/2008 |
| WO | WO 2008082334 | 7/2008 |
| WO | WO 2008082335 | 7/2008 |
| WO | WO 2008082336 | 7/2008 |
| WO | WO 2009067048 | 5/2009 |
| WO | WO 2010050856 | 5/2010 |
| WO | WO 2010082893 | 7/2010 |
| ZA | 8608745 | 7/1987 |

OTHER PUBLICATIONS

U.S. Appl. No. 13/226,156, filed Sep. 6, 2011, Donnelly et al.
U.S. Appl. No. 13/281,702, filed Oct. 26, 2011, Kesseli et al.
U.S. Appl. No. 13/281,725, filed Oct. 26, 2011, Dewis et al.
"A High-Efficiency ICR Microturbine for Commercial Vehicle Propulsion," PACCAR, date unknown, 11 pages.
"Benefits of the Microturbine to Power the Next Generation of Trucks." Kenworth Truck Company, date unknown, 9 pages.
"Why Gas Turbines have a Future in Heavy Duty Trucks." Capstone Turbine Corporation, Brayton Energy, LLC, Kenworth Truck Company, a PACCAR Company, Peterbilt Truck Company, a PACCAR Company, Apr. 2009, 10 pages.
MacKay et al. "High Efficiency Vehicular Gas Turbines," SAE International, 2005, 10 pages.
Wolf et al. "Preliminary Design and Projected Performance for Intercooled-Recuperated Microturbine," Proceedings of the ASME TurboExpo 2008 Microturbine and Small Turbomachinery Systems, Jun. 9-13, 2008, Berlin, Germany, 10 pages.
Nemeth et al. "Life Predicted in a Probabilistic Design Space for Brittle Materials With Transient Loads," NASA, last updated Jul. 21, 2005, found at http://www.grc.nasa.gov/WWW/RT/2004/RS/RS06L-nemeth.html, 5 pages.
International Preliminary Report on Patentability for International (PCT) Patent Application No. PCT/US2011/026865, dated Sep. 4, 2012, 8 pages.
U.S. Appl. No. 13/080,104, filed Apr. 19, 2011, Donnelly et al.
U.S. Appl. No. 13/175,564, filed Jul. 1, 2011, Kesseli et al.
U.S. Appl. No. 13/180,275, filed Jul. 11, 2011, Kesseli et al.
U.S. Appl. No. 13/210,121, filed Aug. 15, 2011, Donnelly et al.
U.S. Appl. No. 61/501,552, filed Jun. 27, 2011, Kesseli et al.
Background of the Invention for the above-captioned application (previously provided).
"Analysis of Technology Options to Reduce the Fuel Consumption of Idling Trucks," Stodolsky, F., L. Gaines, and A. Vyas, Argonne National Laboratory, ANL/ESD-43, Jun. 2000, 40 pages.
Balogh et al. "DC Link Floating for Grid Connected PV Converters," World Academy of Science, Engineering and Technology Apr. 2008, Iss. 40, pp. 115-120.
International Search Report for International (PCT) Patent Application No. PCT/US2011/026865, mailed Apr. 28, 2011 2 pages.
Written Opinion for International (PCT) Patent Application No. PCT/US2011/026865, mailed Apr. 28, 2011 6 pages.

* cited by examiner

DISPATCHABLE POWER FROM A RENEWABLE ENERGY FACILITY

CROSS REFERENCE TO RELATED APPLICATION

The present application claims the benefits, under 35 U.S.C. §119(e), of U.S. Provisional Application Ser. No. 61/309,716 entitled "Dispatchable Power from a Renewable Energy Facility", filed Mar. 2, 2010; U.S. Provisional Application Ser. No. 61/371,501 entitled "Dispatchable Power from a Renewable Energy Facility", filed Aug. 6, 2010 and Provisional Application Ser. No. 61/422,970 entitled "Dispatchable Power from a Renewable Energy Facility", filed Dec. 14, 2010, each of which is incorporated herein by reference.

FIELD

The present invention relates generally to the field of supplementary power for renewable power generating facilities.

BACKGROUND

Renewable energy resources are becoming an increasingly important part of the electricity generation portfolio. To encourage renewable energy deployment, many governments provide financial incentives and have established renewable energy portfolio standards. For example, California has mandated that 33% of all energy consumed in California will be from renewable energy by the year 2020. Wind and solar are two widely used renewable technologies but both are unpredictable and require additional spinning reserves be available on other parts of the grid. These standby reserves are typically large coal-fired or natural gas plants running inefficiently at part load. As the penetration of wind and solar increases, additional pressure will be placed on grid resources to maintain its reliability.

There are now many converters of renewable energy sources (primarily solar and wind) connected into most major grid networks. Improvements of power semiconductors and signal processors have led to a new generation of power converters and control strategies for these converters. Recently, depending on converter type, there have been hardware and software methods proposed and implemented for increasing converter efficiency. Even so, power from renewable energy remains expensive compared to non-renewable sources of power. Efficiency is still one of the most critical parameters of a grid connected system that is being pursued to make renewables more competitive.

Solar power is the generation of electricity from sunlight. This can be direct as with photovoltaics ("PV"), or indirect as with concentrating thermal solar power, where the sun's energy is focused to boil water for steam which is then used to generate power. A solar cell, or photovoltaic cell is a device that converts light into electric current using the photoelectric effect. Film photovoltaic cells can be made inexpensively in bulk and with conversion efficiencies in the range of about 15% to about 35%. Concentrating photovoltaics are another method of solar power. These systems employ sunlight concentrated onto photovoltaic surfaces for the purpose of electrical power production. Solar concentrators of all varieties may be used, which are often mounted on a solar tracker in order to keep the focal point upon the cell as the sun moves across the sky. Tracking can increase flat panel photovoltaic output by 20% in winter, and by 50% in summer.

The largest solar power plants, with outputs in the range of about 350 MW, are concentrating solar thermal plants, but recently multi-megawatt photovoltaic plants have been built with peak outputs in the range of about 40 to about 100 MW.

Modern wind turbines range from around 600 kW to about 7 MW of rated power. The power output of a turbine is a function of the cube of the wind speed, so as wind speed increases, power output increases dramatically. Areas where winds are stronger and more constant, such as offshore and high altitude sites, are preferred locations for wind farms. Typical capacity factors are 20-40%, with values at the upper end of the range in particularly favorable sites.

Globally, the long-term technical potential of wind energy is believed to be five times total current global energy production, or 40 times current electricity demand. This could require large amounts of land to be used for wind turbines, particularly in areas of higher wind resources. Offshore resources experience mean wind speeds of ~90% greater than that of land, so offshore resources could contribute substantially more energy. This number could also increase with higher altitude ground-based or airborne wind turbines.

Renewable energy power plants such as solar farms, wind turbine farms and hydro turbine facilities provide an important source of secure, non-declining and carbon-free energy available to the power grid of a region. These renewable sources of energy are, however, not reliable as continuous sources of power to an electrical grid and therefore typically serve as supplementary sources of energy to the grid.

As renewables achieve higher levels of penetration, these low-availability or intermittently available renewable power generating facilities can reduce grid stability. In some instances, reliable fossil fuel generating plants, such as coal-fired power plants, expand their operations to create the spinning reserves that may be required when demand is high and the output from renewables is low.

Therefore, there remains a need for innovative methods to use other sources of prime power to provide fully available, continuous, reliable power, often called dispatchable power from power generating facilities that have a substantial fraction or all of their power generating capacity derived from intermittently available renewable energy sources.

SUMMARY

These and other needs are addressed by the various embodiments and configurations of the present invention which are directed generally to the placement of one or more fully available energy sources (e.g. prime movers) on a DC link at a location inside or adjacent to an inverter-based renewable energy site. The fully available energy sources can be any AC or DC source and may be a carbon-neutral device, such as an AC or DC prime mover or other power generation device running on biomass. The AC or DC prime mover is a power source, such as a diesel engine, a gas turbine engine, a microturbine, a Stirling engines, a spark ignition engine, a fuel cell, a non-thermal chemically powered motors and/or combination thereof. Fully available DC prime movers can add reliability to an intermittently available renewable energy asset that is reaching its maximum penetration within the grid due to its unpredictability and the requirement for spinning reserves on other parts of the grid. By deploying fully available power sources, whether based on a renewable or non-renewable energy sources, wind and solar can continue increasing their share of generation without adversely affecting the stability of the grid and by removing a substantial portion of the requirement for spinning reserves from conventional power plants be available on other parts of the grid.

The disclosed embodiments can provide a portion or all of the power to intermittently available renewable power generating facilities so that the power output to the grid is dispatchable power. In one configuration, a method and means are disclosed to utilize high-efficiency engines operated on various fuels, some of which may be non-fossil fuels along with an energy storage device, to maintain a constant and fully available power output from the power generating facility. For a renewable power generating facility such as wind or solar, the addition of reliable, relatively clean back-up power can increase the utilization of the existing power electronics necessary to regulate the required quality of power input to the grid. Typical utilization of renewable installations is in the range of 10 to 30% for solar and in the range of 30 to 70% for wind turbines. By increasing the utilization to substantially 100%, the levelized cost of electricity ("LCOE") can be reduced and the price paid by the grid utility to the generating plant can be increased because the power output is now dispatchable.

The electrical architecture of a renewable power plant is a renewable AC or DC energy source providing electrical energy and power to a DC bus. The DC bus (also referred to as a DC link) is attached to a sophisticated, expensive power electronics package, commonly called an inverter to provide regulated AC power to the electrical grid. In one configuration, one or more engines are used to provide DC power to the DC link. The engines can provide energy and power when needed to make up any deficit in energy and power flowing from the intermittently available renewable energy source. By providing this supplementary power to the DC link, there can be no additional requirement for sophisticated and expensive power electronics to provide the required regulated AC power to the electrical grid since these power electronics are sized for the full rated capacity of the renewable energy source. If the engines can be fully brought on-line as needed within an approximately 2 to 5 minute, then back-up or spare engines can provide a spinning reserve capability.

In another configuration, flexibility of engine power input is provided by use of multiple high-efficiency, fuel flexible engines to provide DC power to the DC link. An energy storage device such as a battery pack for example, can be included to provide DC power to the DC link to clamp DC bus voltage and to compensate for slow engine start-up time. If the engines can be brought on-line within a short enough time period to provide spinning reserves, a battery pack can be used to provide spinning reserves within a very short time frame measured in 1 or 2 cycles at the AC power frequency. In another configuration, the power generating facility of this disclosure can provide its own spinning reserves with immediately available electrical energy from a storage device such as a battery pack.

In another configuration, the exhaust from the back-up engines is used to power a heat recovery plant which can be configured to deliver heat energy or additional electrical energy.

A DC link can allow any AC source of energy, such as an engine with a DC generator for example, to be rendered indistinguishable from any DC source of energy such as a photovoltaic cell or battery pack for example. As all the generated energy passes through the DC link, it can be thereupon be converted to AC or DC power for ultimate use.

This technique of first converting all AC sources of electrical energy to DC energy can allow the various intermittently available renewable and fully available power-generating sources to be operated without requiring them to be synchronized.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

The terms "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Automatic and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed, Human input that consents to the performance of the process or operation is not deemed to be "material".

Computer-readable medium as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

DC bus means DC link and the terms may be used interchangeably.

Determine, calculate and compute and variations thereof, as used herein, are used interchangeably and include any type of methodology, process, mathematical operation or technique.

Dispatchable power is electrical power that is available on demand by the main power grid.

An energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a pumped storage facility, a compressed air storage system, an array of a heat storage blocks, a bank of flywheels or a combination of storage systems.

An engine is a prime mover and refers to any device that uses energy to develop mechanical power, such as motion in some other machine. Examples are diesel engines, gas turbine engines, microturbines, Stirling engines and spark ignition engines In electrical power generation, frequency-response reserves (also known as regulating reserves) are provided as an automatic reaction to a loss in supply. It occurs because immediately following a loss of supply, the generators slow down due to the increased load. To combat this slowing, many generators have a governor. By helping the generators to speed up, these governors provide a small boost to both the output frequency and the power of each generator. However because the frequency-response reserve is often small and not at the discretion of the system operator it is not considered part of the operating reserve.

A fully available power source or facility is a power source or facility whose power is available on-demand at all times, even when not required. Examples are engines, fuel cells, steam generators, hydro-electric facilities which can be made available at all times even in times of unit or component failure by, for example, providing back-up units or components. A fully available power source or facility may be a renewable power source. An example would be an engine running on a renewable bio-fuel.

The grid or grid power as used herein is a term used for an electricity network which may support some or all of electricity generation, electric power transmission and electricity distribution. The grid may be used to refer to an entire continent's electrical network, a regional transmission network or may be used to describe a subnetwork such as a local utility's transmission grid or distribution grid. Generating plants may be large or small and may be located at various points around the grid. The electric power which is generated is stepped up to a higher voltage—at which it connects to the transmission network. The transmission network will move (wheel) the power long distances until it reaches its wholesale customer (usually the company that owns the local distribution network). Upon arrival at the substation, the power will be stepped down in voltage—from a transmission level voltage to a distribution level voltage. As it exits the substation, it enters the distribution wiring. Finally, upon arrival at the service location, the power is stepped down again from the distribution voltage to the required service voltage(s). Existing national or regional grids simply provide the interconnection of facilities to utilize whatever redundancy is available. The exact stage of development at which the supply structure becomes a grid is arbitrary. Similarly, the term national grid is something of an anachronism in many parts of the world, as transmission cables now frequently cross national boundaries. Utilities are under pressure to evolve their classic topologies to accommodate distributed generation. As generation becomes more common from rooftop solar and wind generators, the differences between distribution and transmission grids will continue to blur.

Hydro means water, as in hydro power means power derived from flowing water.

An intermittently available power source or facility is a power source or facility whose power is available only intermittently because of natural variations. Examples are solar, wind, wave and tidal power.

LCOE as used herein means the levelized cost of electricity.

Maximum Power Point ("MPP") is a term used in solar and wind energy power generation. It is the voltage and current condition at which the product of the voltage and current provides the highest possible power output for a given set of environmental conditions.

Maximum Power Point Tracking ("MPPT")) is a term used in solar and wind energy power generation and refers to the methods used for maximizing solar input to solar panels or wind velocity to the rotor of a wind turbine. MPPT is an electronic system that operates the solar cells or wind turbines in a manner that allows the modules to produce all the power of which they are capable. MPPT is not a mechanical tracking system that physically moves the modules. MPPT is a fully electronic system that varies the electrical operating point of the modules so that the modules are able to deliver maximum available power. MPPT can be used in conjunction with a mechanical tracking system, but the two systems are completely different.

A non-renewable energy source is a natural energy resource which cannot be produced, grown, generated, or used on a scale which can sustain its consumption rate. These resources often exist in a substantially fixed amount, or are consumed much faster than nature can create them. Fossil fuels, such as coal, petroleum, natural gas and the like are examples. These fossil fuels typically take thousands to millions of years to form naturally. In contrast, resources such as timber, when harvested sustainably, or metals, which can be recycled, are considered renewable resources. Nuclear energy is based on a resource (uranium ore) which can be consumed to produce other elements which can, in turn, can be used in breeder reactors to produce energy at a rate that would allow nuclear energy to fall somewhere between a renewable and non-renewable energy source.

Non-spinning reserves or supplemental reserves are the extra generating capacity that is not currently connected to the system but can be brought online after a short delay. In isolated power systems, this typically equates to the power available from fast-start generators. However in interconnected power systems, this may include the power available on short notice by importing power from other systems or retracting power that is currently being exported to other systems.

Operating reserve in electrical grids or networks, is the generating capacity available to the system within a short interval of time to meet demand in case a generator goes down or there is another disruption to the supply. Most power systems are designed so that, under normal conditions, the operating reserve is always at least the capacity of the largest generator plus a fraction of the peak load. The operating reserve is made up of the spinning reserve as well as the non-spinning or supplemental reserve. In addition, there are two other kinds of reserve power that are often discussed in combination with the operating reserve: the frequency-response reserve and the replacement reserve.

A permanent magnet motor is a synchronous rotating electric machine where the stator is a multi-phase stator like that of an induction motor and the rotor has surface-mounted permanent magnets. In this respect, the permanent magnet synchronous motor is equivalent to an induction motor where the air gap magnetic field is produced by a permanent magnet. The use of a permanent magnet to generate a substantial air gap magnetic flux makes it possible to design highly efficient motors. For a common 3-phase permanent magnet synchronous motor, a standard 3-phase power stage is used. The power stage utilizes six power transistors with independent switching. The power transistors are switched in ways to allow the motor to generate power, to be free-wheeling or to act as a generator by controlling frequency.

A prime power source refers to any device that uses energy to develop mechanical or electrical power, such as motion in some other machine. Examples are diesel engines, gas turbine engines, microturbines, Stirling engines, spark ignition engines and fuel cells.

A power control apparatus refers to an electrical apparatus that regulates, modulates or modifies AC or DC electrical power. Examples are an inverter, a chopper circuit, a boost circuit, a buck circuit or a buck/boost circuit.

Power density as used herein is power per unit volume (watts per cubic meter).

A renewable energy source is an energy source which is renewable or replenished by natural processes on a time scale much faster than consumption. Examples are energy which comes from sunlight, wind, rain, tides, and geothermal heat. Soil, water, forests, plants, and animals are also renewable resources as long as they are consumed at a rate less than the rate at which they can be reasonably be replaced. Solar, wind, tidal, wave, and geothermal energy are all renewable resources. Renewable resources such as the movement of water (hydropower, including tidal power; ocean surface waves used for wave power), wind (used for wind power), geothermal heat (used for geothermal power); and radiant energy (used for solar power) are practically infinite and cannot be depleted, unlike their non-renewable counterparts, which will be depleted if consumption rates are high relative to natural replacement rate. New renewables such as small hydro, naturally-occurring and man-made biomass, wind, solar, geothermal, and biofuels are also considered renewable energy sources. As bio-fuels are renewable, an engine or a bank of engines running on bio-fuel can be considered a renewable power source.

A renewable power facility is an electrical power generating facility whose energy is derived from renewable energy source. As used herein, a renewable power facility also includes the necessary power electronics required to condition the source power for DC or regulated AC transmission within an electrical grid.

In electrical power generation, replacement reserves (also known as contingency reserves) are reserve power resources provided by generators that require a longer start-up time (typically thirty to sixty minutes). It is used to relieve the generators providing the spinning or non-spinning reserve and thus restore the operating reserve (the replacement reserve is sometimes known as the 30 or 60-minute operating reserve).

A report producing device as used herein is any device or collection of devices adapted to automatically and/or mechanically produce a report. As one example, a report producing device may include a general processing unit and memory (likely residing on a personal computer, laptop, server, or the like) that is adapted to generate a report in electronic format. The report producing device may also comprise a printer that is capable of generating a paper report based on an electronic version of a report.

Spinning reserves constitute a fraction of the rated power of a power generating facility that is held in reserve and that can be immediately (within 5 to 10 minutes of request) added to the power output of a power generating facility on demand by the main power grid. The spinning reserve is the extra generating capacity that is available by increasing the power output of generators that are already connected to the power system. The spinning reserve is the extra generating capacity that is available by increasing the power output of generators that are already connected to the power system.

A switched reluctance motor is a type of synchronous electric motor that induces non-permanent magnetic poles on the ferromagnetic rotor. Torque is generated through the phenomenon of magnetic reluctance. A switched reluctance motor may be known as a synchronous reluctance motor, variable reluctance motor, reluctance motor or variable reluctance stepping motor. Reluctance motors can have very high power density at low-cost, making them ideal for many applications. Disadvantages are high torque ripple when operated at low speed, and noise caused by torque ripple. Until recently, their use has been limited by the complexity inherent in both designing the motors and controlling them. These challenges are being overcome by advances in the theory, by the use of sophisticated computer design tools, and by the use of low-cost embedded systems for motor control. These control systems are typically based on microcontrollers using control algorithms and real-time computing to tailor drive waveforms according to rotor position and current or voltage feedback. The switched reluctance motor (SRM) is a form of stepper motor that uses fewer poles than a synchronous reluctance motor. The SRM can have the lowest construction cost of any industrial electric motor because of its simple structure. Common usages for an SRM include applications where the rotor must be held stationary for long periods and in potentially explosive environments such as mining because it lacks a mechanical commutator. The phase windings in a SRM are electrically isolated from each other, resulting in higher fault tolerance compared to inverter driven AC induction motors. The optimal drive waveform is not a pure sinusoid, due to the non-linear torque relative to rotor displacement, and the highly position dependent inductance of the stator phase windings.

Specific power as used herein is power per unit mass (watts per kilogram).

A recuperator is a heat exchanger dedicated to returning exhaust heat energy from a process back into the process to increase process efficiency. In a gas turbine thermodynamic cycle, heat energy is transferred from the turbine discharge to the combustor inlet gas stream, thereby reducing heating required by fuel to achieve a requisite firing temperature.

VAR means reactive volt-amperes. AC power flow can be characterized by three components: real power (also known as active power) measured in watts (W); apparent power measured in volt-amperes (VA); and reactive power (Q), measured in reactive volt-amperes (VAR).

DETAILED DESCRIPTION

Figure 1:
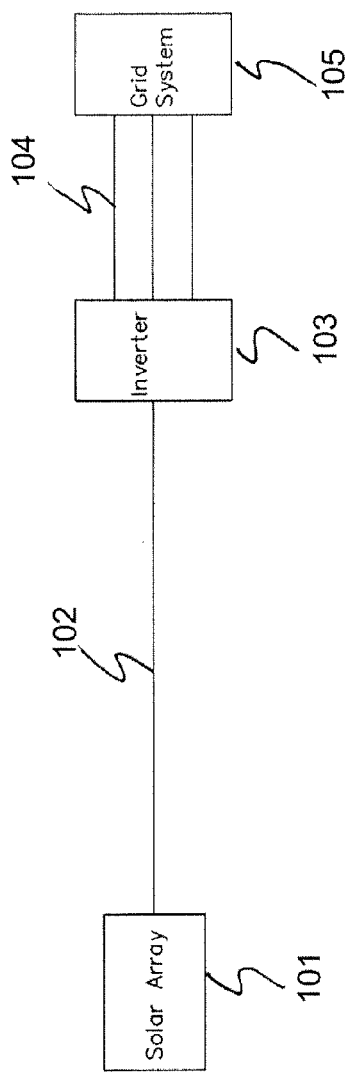
FIG. 1 is a prior art schematic of commonly used solar converter architectures.
Figure 1:
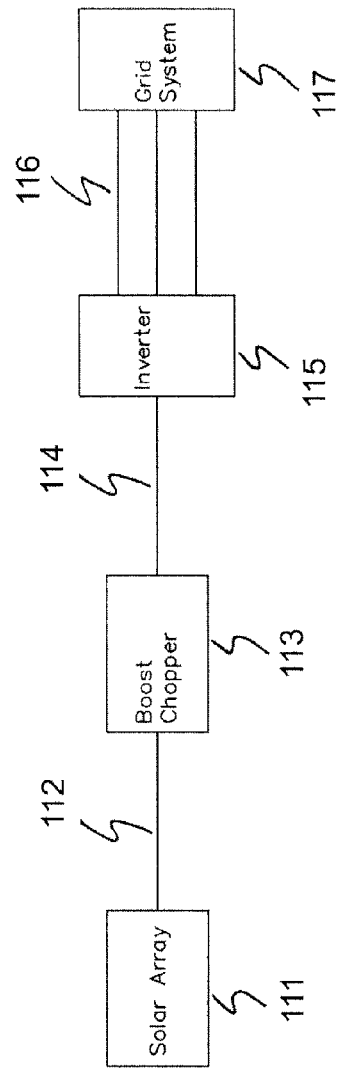

The present invention can provide a cost-effective means that is readily implemented to transform a grid-connected intermittently available renewable power generating facility into a dispatchable power facility, including if required, providing a spinning reserve capability.

Solar Facility

As described, for example, in US Published Patent Application 2010/0052425 entitled "Networked Multi-inverter Maximum Power Point Tracking", solar photovoltaic ("PV") systems produce electrical power which is the product of current and voltage. Operating point and output power are interdependent in individual solar cells, and by extension in multi-cell panels and multi-panel arrays. The interdependence is characterized by a set of current versus voltage and power versus voltage. Each curve has a Maximum Power Point ("MPP"). This point is the operating point (voltage and current) at which the product of the panel's voltage and current provides the highest possible power output for a given set of environmental conditions.

A number of factors influence the MPP of a given cell, module, panel, or array. They include solar radiation energy received on a given surface area in a given time, cell temperature, spectral quality, ambient temperature, age of the panels, zenith and azimuth position of the sun, soiling, and wind speed. In large scale PV systems, on the order of 100's of kilowatts to 10's or 100's of megawatts, a large number of panels or arrays of panels are used covering large ground surface areas. In these large systems, temperature-dependent losses in system components, such as wiring and transformers, also affect the MPP of the system.

Most of these factors are affected by local weather patterns, which are unpredictable and can change rapidly. A complication when planning large installations is that a large installation may cover variable terrain that includes hillsides, gullies, bodies of water, stands of trees, utility easements, or man-made structures. Each of these factors can affect the MPP factors acting on nearby panels and make them behave differently from the reference.

Localized differences in wind speed due to different ground levels or obstructions will affect ambient and cell temperature. Thus, landscape features can cause different panels or arrays to experience differing MPP factors at any given time. Even if the terrain is perfectly featureless, as in some plains regions, broken or moving cloud patterns can affect the MPP of the PV panels below. The more area the installation covers, the more opportunities for shifting cloud patterns or fog patches to decrease the representative accuracy of a reference.

Large-scale PV systems require MPP control for each inverter-connected array in the system to operate at or near its MPP using information from other arrays in the system. In a multi-unit, networked system of PV inverters, this approach sets the operating point of one or more inverters based on an MPP established elsewhere in the network. The operating point may be adjusted by adjusting voltage, current, or both. In large systems, there may be multiple representative references (hereinafter, a "master") each used to set the operating point of other inverter-controlled arrays. Various Maximum Power Point Tracking ("MPPT") methods are employed to increase plant energy capture and reduce fluctuations in the delivered power.

FIG. 1 is a prior art schematic of two commonly used solar converter architectures. FIG. 1a shows a photovoltaic ("PV") array 101 connected by a DC link 102 to an inverter 103 which in turn is connected to an external power grid 105 by an AC link 104. In this configuration, inverter 103 creates an AC waveform suitable for the external grid 105 and also performs the function of Maximum Power Point Tracking ("MPPT") of the PV array 101. Inverter technology is a key technology for reliable and safe grid connection of a PV system. The inverter is also required to generate high-quality power to AC utility system at a reasonable cost. To meet with these requirements, up-to-date technologies of power electronics are applied to PV inverters. By means of high frequency switching of semiconductor devices with Pulse Width Modulation ("PWM") technologies, high-efficiency conversion with high power factor and low harmonic distortion power can be generated. The microprocessor based control circuit accomplishes PV system output power control. Most of the power control schemes of inverters follow the maximum output of the PV array determined by the level of solar radiation at the DC side, and most employ the MPPT control capable of constantly obtaining the maximum output according to the quantity of solar radiation.

A smaller number of power control schemes control the DC link voltage to be approximately constant. FIG. 1b shows a PV array 111 connected by a first DC link 112 to a boost chopper 113. The boost chopper 113 is connected to an inverter 115 by a second DC link 114. Inverter 115 is connected to an external power grid 117 by an AC link 116. In this configuration, inverter 115 creates an AC waveform suitable for the external grid 117. Boost chopper 113 performs the function of Maximum Power Point Tracking ("MPPT") of the PV array 111. This figure was taken from "DC Link Floating for Grid Connected PV Converters", Balogh et al, World Academy of Science, Engineering and Technology 40, 2008.

The operable DC voltage range for a system with capacity of 1 kW to 10 kW is from about 40V to about 750V. The operable DC voltage range for a capacity of 10 kW or greater is from about 200V to about 800V.

Figure 2:
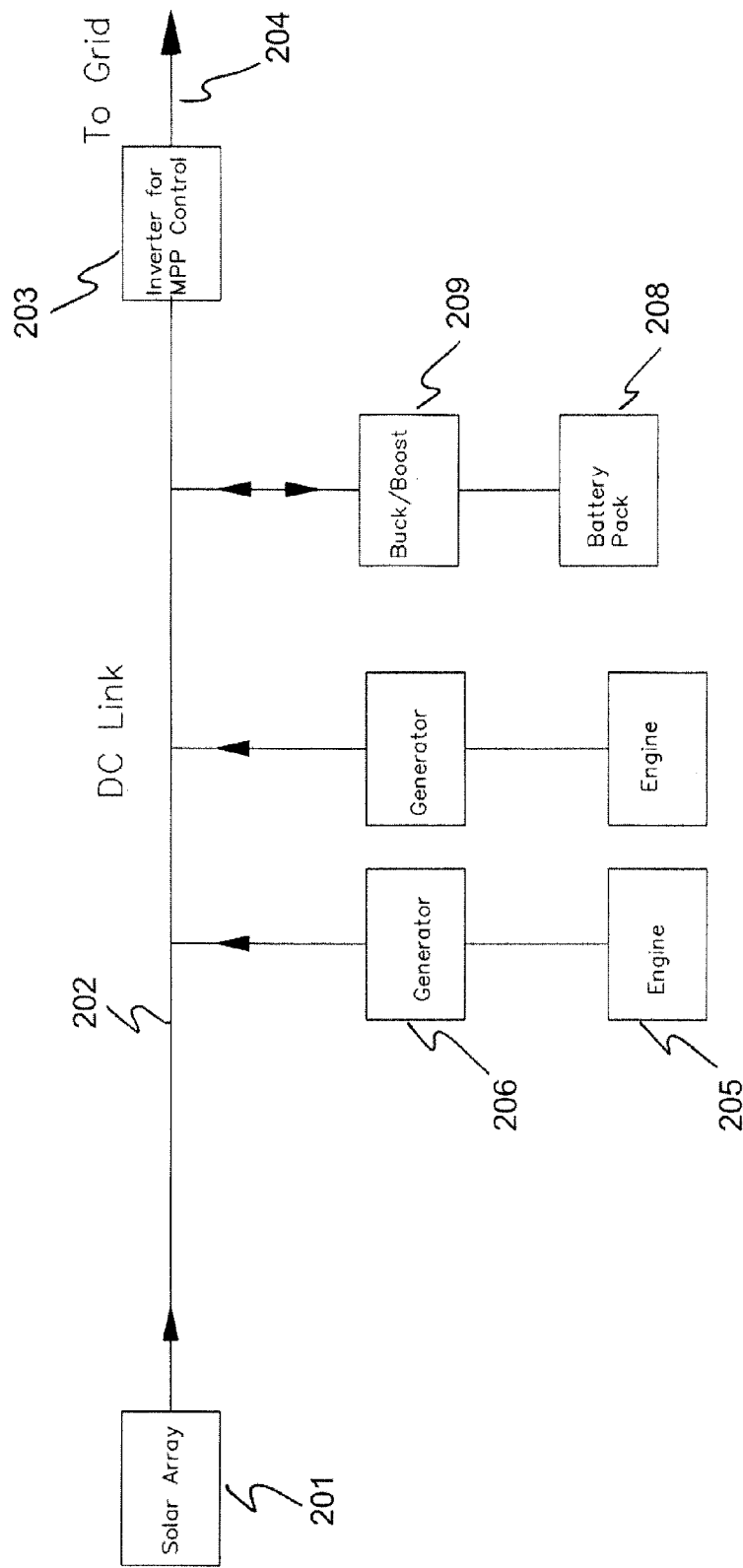
FIG. 2 is a schematic of a first method of transforming a solar converter architecture to provide dispatchable power.

FIG. 2 is a schematic of a first method of transforming a solar converter architecture to provide dispatchable power. This figure illustrates a photovoltaic solar array 201 of one or more photovoltaic solar collectors whose electrical energy, when available, can be delivered to an electrical grid 204 via an inverter 203 connected to the solar array 201 by an unregulated DC link 202. The inverter 203 also provides for maximal power point ("MPP") tracking as described for example in US Patent Application 2010/0052425. The voltage on the DC link floats as the inverter 203 tracks the MPP. The DC link voltage may vary from zero (at night for example) to a maximum of up to about 1,000 volts in a large solar facility.

The inverter power electronics are sized to provide the maximum solar output power to the grid which occurs when the sun is shining at its maximum onto the solar collectors. As can be appreciated, the power electronics are not utilized full time, for example when the sun is at an angle to the collectors, on cloudy days and when the sun has set. Typical utilization factor for the power electronics is in the range of 10 to 30%.

In the present invention, a number of internal combustion engines 205 whose shaft power is converted to electrical output via generators 206 are connected to the DC link 202. These engines provide DC power to the DC link to make up for any deficit from the solar cells so that maximum power may be provided at any time, when required, to the grid. An electrical energy storage pack such as for example a battery pack 208 is shown connected electrically to the DC link 202 between the solar photovoltaics and the power electronics by its buck-boost circuit 209. As will be described below, the output of the engines are controlled by the excitation on their generators to follow the varying voltage on DC link 202. The battery pack is controlled by its buck-boost circuit to follow the varying voltage on DC link 202.

Figure 3:
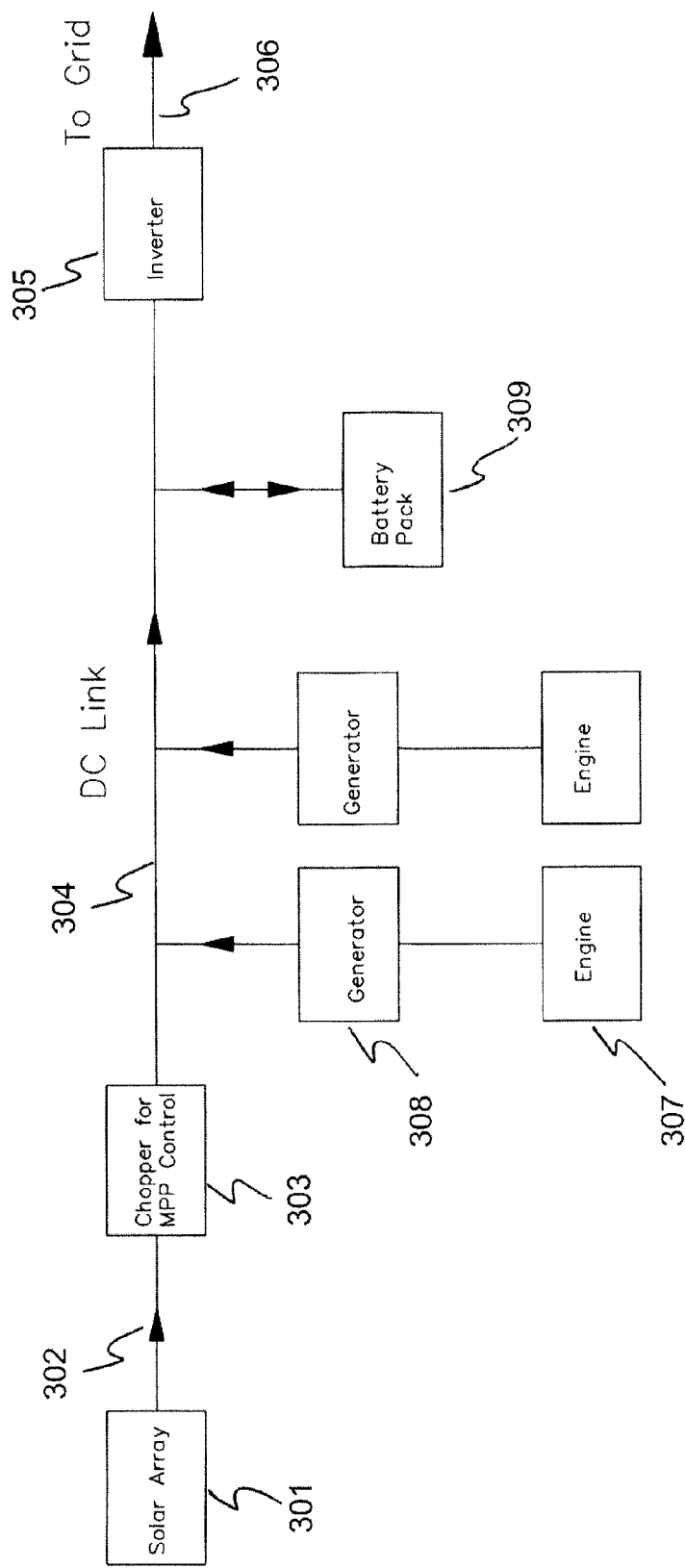
FIG. 3 is a schematic of a second method of transforming a solar converter architecture to provide dispatchable power.

FIG. 3 is a schematic of a second method of transforming a solar converter architecture to provide dispatchable power. This figure illustrates a photovoltaic solar array 301 of one or more photovoltaic solar collectors whose electrical energy, when available, can be delivered to an electrical grid 306 by first passing through a boost chopper 303 connected to PV array 301 by a first DC link. The function of boost chopper 303 is to provide MPP control and to output an approximately stable voltage to a second DC link 304. Inverter 305 provides the required AC power to the grid 306. In this configuration, engines 307 with generators 308 are connected to the second DC link which is maintained at an approximately constant voltage by the boost chopper 303 and battery pack 309.

The arrangements shown in FIGS. 2 and 3 will transform an intermittently available renewable solar power facility to a reliable, fully available dispatchable power facility without the need to modify or upgrade the power electronics which connect the power generating facility to the grid. As will be discussed below, energy storage (for example, a battery pack, bank of flywheels, a capacitor bank or the like) and/or spare engines can be configured to provide a spinning reserve capability.

In the present invention, when solar power generation is at a maximum, all the power is provided by the solar renewables. For example, if this is a 4.5 MW rated power plant and the desired DC bus voltage is 750 volts, then full power is achieved when the solar cells output is 6,000 amperes. The solar output current can be monitored by current sensors or inferred by other well-known means and if the current falls below this level, then one or more engines can be activated and engaged to provide power to the DC link in order to bring the current back up to full power (6,000 amperes in the present example). If the engine or engines require a start-up period in excess of about 5 minutes, the ampere deficit can be made up, at least for short periods, by an energy storage system such as a battery pack which can provide a burst of instantaneous power at the required voltage. When all the engines are engaged, they can provide full power (4.5 MW in this example) which would be required, for example, at night. If the grid requires less than maximum power, the number of engines engaged on the DC link can be reduced as required.

Figure 4:
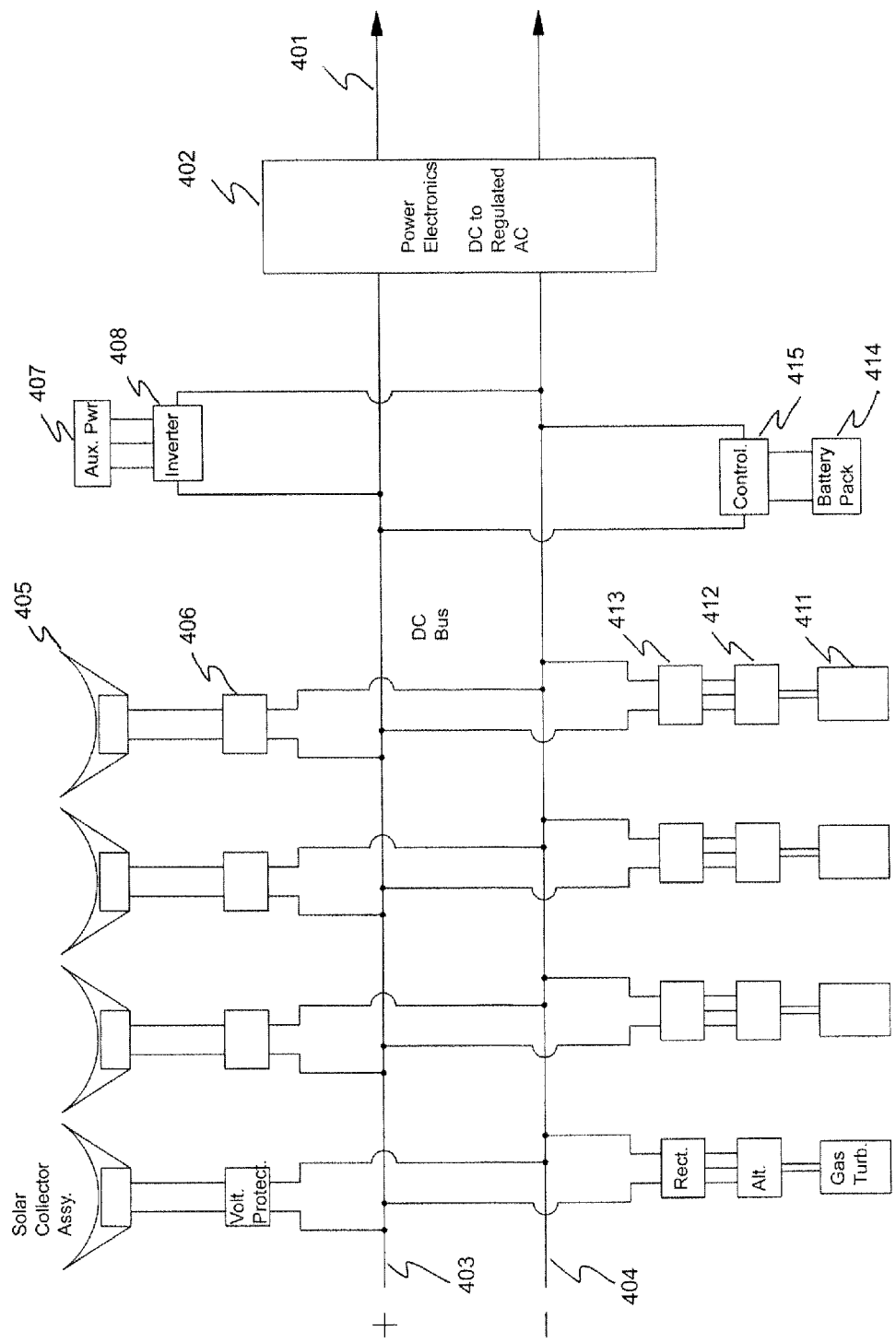
FIG. 4 is a schematic of an electrical architecture for a solar power generating facility capable of providing dispatchable power to a power grid.

FIG. 4 is a schematic example of an electrical architecture for a solar power generating facility of the present invention. When the sun is shining, solar energy is collected by any of a number of well-known solar collector arrays 405 and converted to DC electrical energy by any of a number of well-known photovoltaic solar cells. The DC electrical energy is delivered to a DC bus (represented by positive conductor 403 and negative conductor 404) which may be maintained at a selected voltage level by battery pack 414. Electrical protection circuits 406 prevent electrical voltage transients or other excessive voltages from damaging the solar cells if such voltage transients or other excessive voltages arise on the DC bus. The DC power on the DC bus is then directed to a power electronics package 402 where it is converted to AC power and conditioned/regulated so that it can be delivered to a main electrical power grid when required and available. Power electronics 402 are typically very expensive and represent a significant cost component of a solar power generating facility. Therefore, adding engines to fill in when the solar cells are operating below full power increases the utilization factor of the expensive power electronics 402 from the about 10 to 30 percent range to about 100%. FIG. 4 also shows an auxiliary AC power supply 407 which derives its power from the DC bus via an inverter 408. This auxiliary power supply is typically used to provide power for various functions within the power generating facility.

The components describes above form a renewable solar power generating facility with a peak power output capacity of X megawatts where X is in the range of about 1,000 watts (a home solar power supply) to about 10 megawatts or more (a power generating station supplying a major power grid). The above renewable solar power generating facility can only provide power to the grid when the sun is shining and so cannot provide dispatchable power (power on demand).

When a bank of engines 411 are attached to the DC bus, the engines can be turned on as needed to make up any energy/power deficit caused by clouds diminishing the incoming solar energy or by the sun setting. These engines 411 require a source of fuel such as, for example, diesel, bio-diesel, natural gas, hydrogen, ethanol, methanol, butanol and the like. The fuel for the engines is typically, but not always, from a non-renewable energy source. The engines are attached to the DC bus via alternators 412 and rectifiers 413. Rectifiers 413 are required so that power cannot flow back through alternators 412 from the DC bus. If the solar power generating facility has a peak power output capacity of X megawatts, then the total peak power rating of the bank of engines 411 must also be about X megawatts in order for the power output from the generating station to be constant when there is a deficit of incoming solar energy or no incoming solar energy at all. There may be one engine or there may be many engines attached to the DC bus. In a home solar power supply, one engine may be all that is required. In a large solar power generating facility, the advantage of a number of engines is that only some need be activated if there is a deficit of incoming solar energy such as might occur for intermittent cloud cover, changing seasons and the like. As can be appreciated, all the engines could be activated to maintain full generating power capacity during the night.

The battery pack 414 and its voltage controller 415 can be used to stabilize the DC bus voltage and can also be used to provide power to the bus when engines are being started up or when there are short-lived deficits in solar power input to the DC bus. The battery pack 414 can be charged when there is a surfeit of power on the DC bus, whether from the incoming solar power, from one of more of the engines 411, or from the grid. The battery controller 415 allows for and controls the flow of energy to and from the battery and the DC bus.

As can be appreciated, the battery pack can be replaced by any other form of energy storage system capable of provided very rapid power response such as, for example, a bank of flywheels. It is also possible to implement the present invention without an energy storage system by always having at least one engine idling on stand-by duty unless of course engines can be started and brought up to full operating consition within a period of about one to about 5 minutes.

If configured for dispatchable power without need for immediate spinning reserves (that is spinning reserves that can come on-line within 1 or 2 cycles of the AC frequency required by the grid), an energy storage system, such a battery pack 414, need not be included.

An advantage of the above architecture is that the engines can be attached to the DC bus with a minimum of additional electronics (each is provided with its own alternator and rectifier or DC generator) and the power electronics 402 of the solar power generating facility need not be changed or upgraded. For example, engines with a power rating in the range of 500 kW can be vehicle or industrial engines with commonly available, low-cost generators.

Consider the example of a 4.5 MW power generating facility. The rated solar power output of all the solar collectors is about 4.5 MW and the rated power output of all the engines should also be about 4.5 MW. If 500 kW engines are utilized, then at least 9 engines 411 would be required. Ten engines would be preferable, with the extra engine serving as a back-up. If 250 kW engines are utilized, then at least 18 engines 411 would be required with a possible additional engine for backup.

The power generating facility of FIG. 4 would thus be capable of producing full power at all times and would thus be dispatchable power that could be sold to a main power grid at dispatchable power rates ($ per MW). Dispatchable power typically commands a higher selling price than non-dispatchable power. The advantage of this configuration is that a substantial fraction of the energy output (about 25% to about 50%) can be from an intermittently available renewable source even if the engines are operated on fossil fuels. If the engines can be operated on natural gas (such as, for example, gas turbine engines), then the reduction in greenhouse gases can be substantial. Ultimately, the engines can be operated on hydrogen and this would make the entire power plant CO2 free. If the engines are operated on renewable bio-fuels, this would make the entire power plant fully available and renewable.

Figure 5:
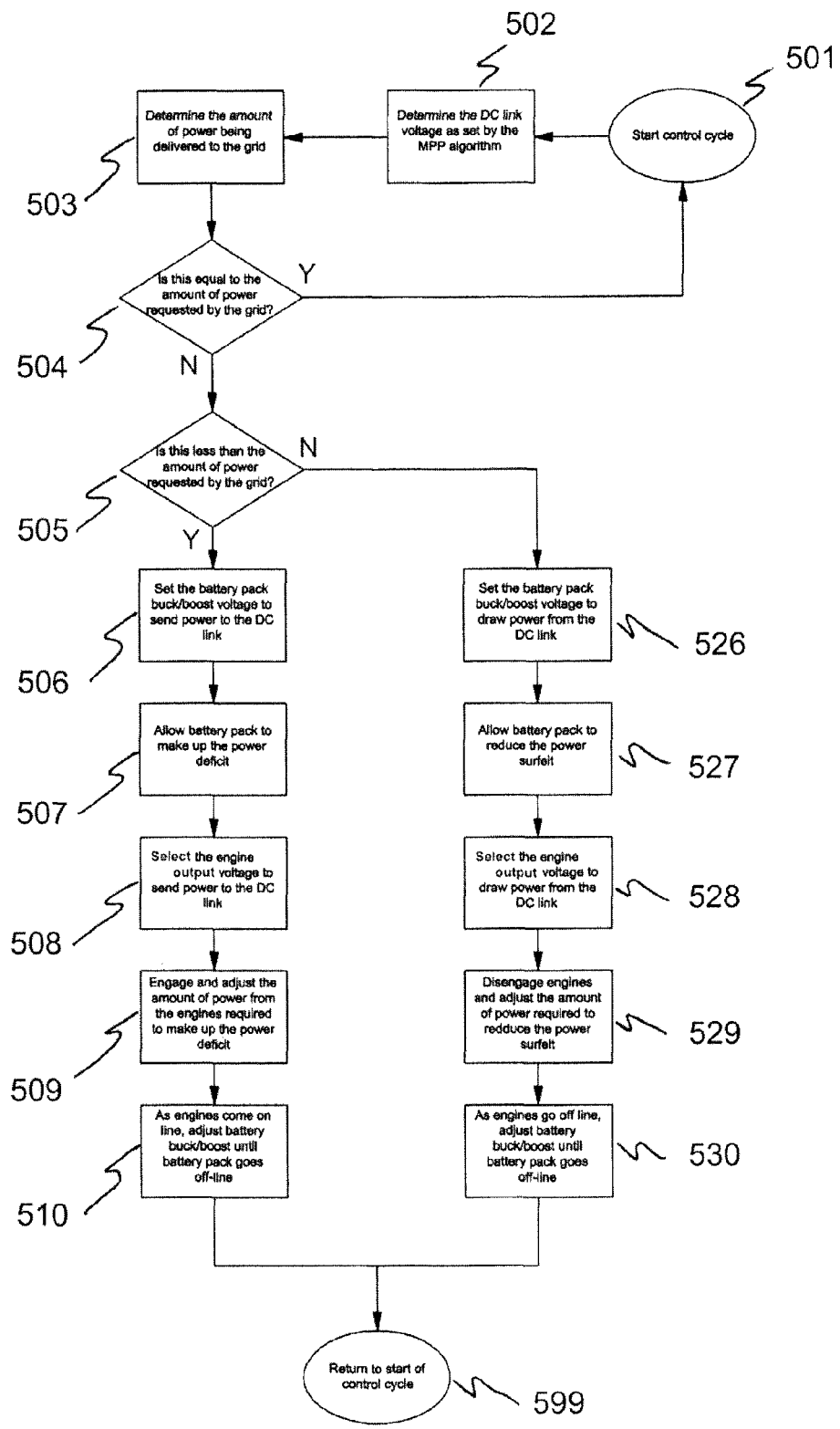
FIG. 5 is a flow diagram illustrating a first method of controlling back-up power to a first method of converting a solar converter architecture for dispatchable power.

FIG. 5 is a flow diagram illustrating an example of a first method of controlling back-up power to a first method of converting a solar converter architecture for dispatchable power. This is a flow chart illustrating how a battery pack and one or more engines can be controlled to maintain a requested power input to a grid for the example of FIG. 2 in which a photovoltaic solar array is connected to an inverter by an unregulated DC link. The voltage on the DC link floats in response to the inverter as it tracks the MPP. The control cycle starts (step 501) with a determination of DC link voltage (step 502). Then the amount of power flowing to the inverter is compared to the amount of power being requested by the grid (step 503). If the amount of power being requested by the grid is within a selected range of the amount of power flowing to the inverter (yes in step 504), then the control cycle returns to the start (step 501).

If the amount of power being requested by the grid is not within a selected range of the amount of power flowing to the inverter (no in step 504), then if the amount of power flowing to the inverter is less than the amount of power being requested by the grid (yes in step 505), the buck/boost control of the battery is set (step 506) so that the required amount of additional power flows from the battery pack to the DC link (step 507). Simultaneously, the excitation of the generators of the required number of engines is selected (step 508) so that, when the engine or engines are warmed up so that they can provide the required power, the generator controlling each engine allows power from the engines to flow onto the DC link (step 509). As engine power is delivered to the DC link, the buck/boost control of the battery pack reduces its output voltage so that power flow from the battery decreases as the power flow from the engines increases (step 510). When the engines are delivering the requested amount of power to the DC link, the battery may be switched out of the circuit or the buck/boost control of the battery may be set so that the battery charges (also step 510). If the battery is allowed to recharge, then the power from the engines is increased to provide the proper power flow to the inverter while the battery pack is being recharged. The control cycle then returns (step 599) to the start of the control cycle (back to step 501).

If the amount of power being requested by the grid is not within a selected range of the amount of power flowing to the inverter (no in step 504), then if the amount of power flowing to the inverter is greater than the amount of power being requested by the grid (no in step 505), the buck/boost control of the battery is set (step 526) so that the required amount of surplus power flows to the battery pack from the DC link (step 527). Simultaneously, the excitation of the generators of the required number of engines is selected (step 528) so that the power output of the engines onto the DC link is reduced by the required amount (step 509). As engine power is reduced to the DC link, the buck/boost control of the battery pack increases its output voltage so that power flow to the battery decreases (step 530). When the engines are delivering the requested amount of power to the DC link, the battery may be switched out of the circuit or the buck/boost control of the battery may be set so that the battery charges (also step 530). If the battery is allowed to recharge, then the power from the engines is increased to provide the proper power flow to the inverter while the battery pack is being recharged. The control cycle then returns (step 599) to the start of the control cycle (back to step 501).

As can be appreciated the power output of an engine can be controlled in a number of ways besides the excitation of their generators. The power output of the engine can be varied by increasing or decreasing the rate of fuel consumption within a selected engine efficiency range. The power output of a switch reluctance generator can be varied utilizing active rectification. The power output of a permanent magnet generator can be varied utilizing a buck/boost circuit for control. Depending on the type of generator used to convert mechanical shaft energy to DC electrical, the power output of the engine can be varied by using power electronics such as phase controlled rectification, active rectification or chopper buck, chopper boost or chopper buck/boost. As can be appreciated, a combination of these engine control methods can be utilized.

As can be further appreciated, the steps of FIG. 5 may be controlled by a computer processor and the data can be stored in a memory module for later retrieval and analysis or for transmission to remote computers or other output devices via any number of well-known data transmission means.

Figure 6:
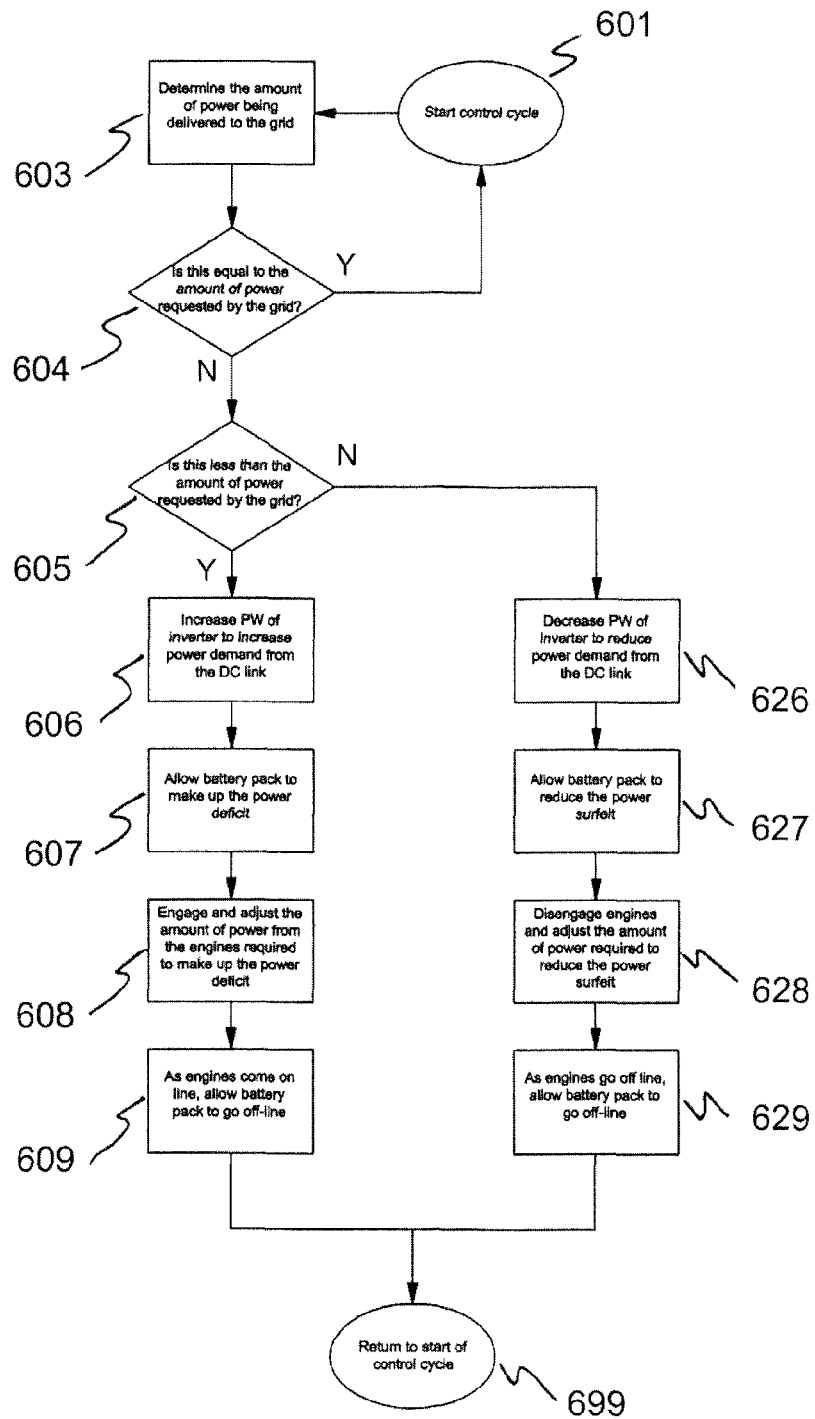
FIG. 6 is a flow diagram illustrating a second method of controlling back-up power to a first method of converting a solar converter architecture for dispatchable power.

FIG. 6 is a flow diagram illustrating a second method of controlling back-up power to a second method of converting a solar converter architecture for dispatchable power. This second method is a preferred method. This is a flow chart illustrating how a battery pack and one or more engines can be controlled to maintain a requested power input to a grid for the example of FIG. 3 in which a photovoltaic solar array is connected to a boost chopper by a DC link. As noted previously, the boost chopper performs the MPP function. The boost chopper is connected to an inverter by a second DC link having a relatively stable DC voltage. The voltage on the second DC link is relatively stable since the boost chopper tracks the MPP and a battery pack acts to further stabilize the voltage on the second DC link. The control cycle starts (step 601) with a determination of the amount of power flowing to the inverter compared to the amount of power being requested by the grid (step 603). If the amount of power being requested by the grid is within a selected range of the amount of power flowing to the inverter (yes in step 604), then the control cycle returns to the start (step 601).

If the amount of power being requested by the grid is not within a selected range of the amount of power flowing to the inverter (no in step 604), then if the amount of power flowing to the inverter is less than the amount of power being requested by the grid (yes in step 605), the pulse width of the inverter is increased (step 606) lowering the voltage on the DC link until the battery pack supplies the required amount of additional power to the DC link (step 607). Simultaneously, the required number of engines is set (step 608) so that, when the engine or engines are warmed up, they can provide the power required by the DC link (step 608). As engine power is delivered to the DC link, the voltage on the DC link increases and the power flow from the battery pack decreases as the power flow from the engines increases (step 609). When the engines are delivering the requested amount of power to the DC link, the battery may be switched out of the circuit or left on-line so that the battery charges (also step 609). If the battery is allowed to recharge, then the power from the engines is increased to provide the proper power flow to the inverter while the battery pack is being recharged. The control cycle then returns (step 699) to the start of the control cycle (back to step 601).

If the amount of power being requested by the grid is not within a selected range of the amount of power flowing to the inverter (no in step 604), then if the amount of power flowing to the inverter is greater than the amount of power being requested by the grid (no in step 605), the pulse width of the inverter is decreased (step 626) raising the voltage on the DC link until the surplus power flows to the battery pack from the DC link (step 627). Simultaneously, the required number of engines is set (step 628) so that the power output of the engines is reduced by the required amount. As engine power is reduced to the DC link, the voltage on the DC link is increased so that power flow to the battery decreases (step 629). When the engines are delivering the requested amount of power to the DC link, the battery may be switched out of the circuit or left on-line so that the battery charges (also step 629). If the battery is allowed to recharge, then the power from the engines is increased to provide the proper power flow to the inverter while the battery pack is being recharged. The control cycle then returns (step 699) to the start of the control cycle (back to step 601).

As can be appreciated the power output of an engine can be controlled in a number of ways. The power output of the engine can be varied by increasing or decreasing the rate of fuel consumption within a selected engine efficiency range. The output of a synchronous generator can be controlled by varying the excitation to the generator. The power output of a switch reluctance generator can be varied utilizing active rectification. The power output of a permanent magnet generator can be varied utilizing a buck/boost circuit to control output such as illustrated in FIG. 2. As can be appreciated, a combination of these engine control methods can be utilized.

As can be further appreciated, the steps of FIG. 6 may be controlled by a computer processor and the data can be stored in a memory module for later retrieval and analysis or for transmission to remote computers or other output devices via any number of well-known data transmission means.

Wind or Hydro Turbine Facility

Figure 7:
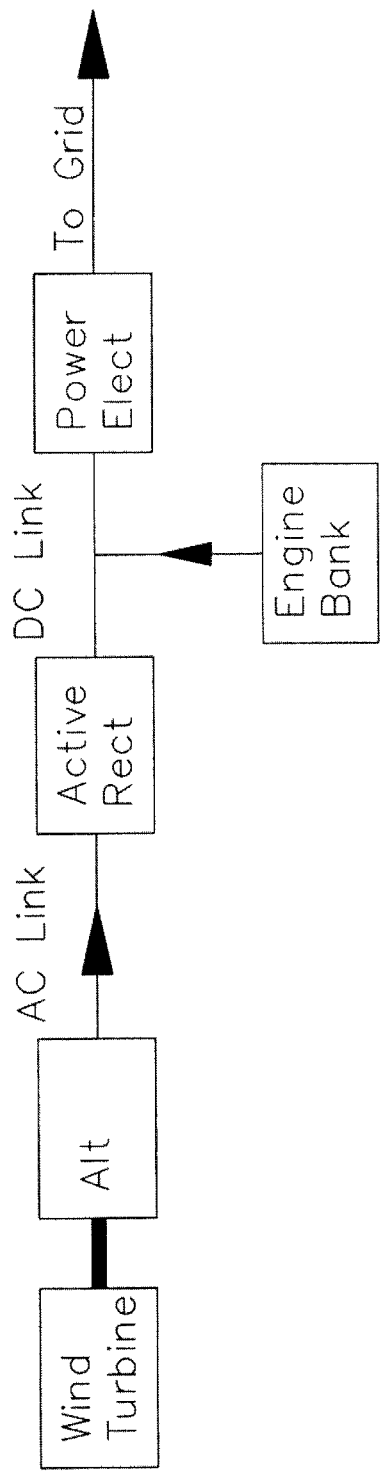
FIG. 7 is a schematic of a wind turbine architecture for dispatchable power.

FIG. 7 is a schematic of a wind turbine architecture for dispatchable power. This figure illustrates a bank of one or more wind turbines, each of which drives an alternator which provides unregulated AC power to an AC link. The AC power is typically rectified by an active rectifier circuit which both rectifies and controls the voltage to a DC link. The active rectifier can provide controlled excitation to an induction alternator for controlling torque loading on the turbine and voltage to the DC link. This is similar to what happen in a permanent magnet alternator where part of the excitation is supplied by the permanent magnets when active rectification is used. This power, when available, can be delivered to an electrical grid by conditioning the unregulated DC power using well-known power electronics. The power electronics are sized to provide the maximum wind turbine output power to the grid which occurs when the wind is blowing at its maximum expected velocity. As can be appreciated, the power electronics are not utilized full time, for example when the wind is blowing lightly or not at all. Typical utilization factor for the power electronics is in the range of about 30 to about 70%, depending on location of the facility. For example, sea-based facilities typically have better utilization than land-based facilities. In the present invention, a bank of internal combustion engines whose shaft power is converted to electrical output via generators and optionally an energy storage pack is connected electrically to the DC link between the active rectifier and the power electronics. These engines provide DC power to the DC link to make up for any deficit from the wind turbines so that maximum power may be provided full time, if required, to the grid. This will transform an intermittently available renewable wind energy power facility to a fully available and reliable dispatchable power facility. As will be discussed below, the optional energy storage (for example, a battery pack, bank of flywheels, a capacitor bank or the like) and/or spare engines can be included to provide a spinning reserve capability.

When wind power generation is at a maximum, all the power is provided by the wind turbine renewables. For example, if this is a 9 MW rated power plant and the desired DC bus voltage is 750 volts, the full power is achieved when the wind turbine output is 12,000 amperes. The wind turbine output current can be monitored by current sensors or inferred by other well-known means and if the current falls below this level, then one or more engines can be activated and engaged to provide power to the DC link in order to bring the current back up to full power (12,000 amperes in the present example). If the engine requires a start-up period, the ampere deficit can be made up, at least for short periods, by an energy storage system such as a battery pack which can provide a burst of instantaneous power at the required voltage. When all the engines are engaged, they can provide full power (9 MW in this example) which would be required for example when the wind is not blowing. If the grid requires less than maximum power, the number of engines engaged on the DC link can be reduced as required.

Figure 8:
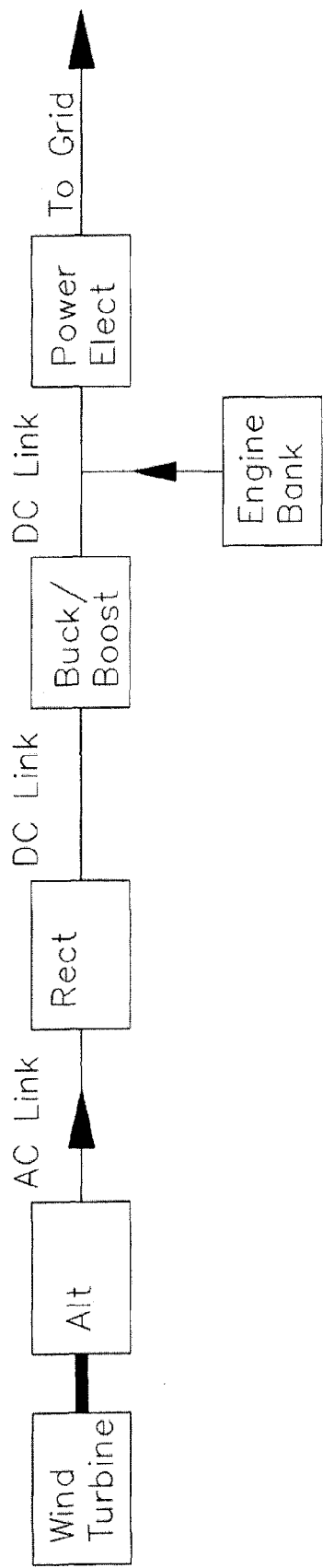
FIG. 8 is a schematic of an alternate wind turbine architecture for dispatchable power.

FIG. 8 is a schematic of an alternate wind turbine architecture for fully available dispatchable power. This figure illustrates a bank of one or more wind turbines, each of which drives an alternator which provides unregulated AC power to an AC link. In this configuration, the AC power is rectified by a passive rectifier circuit. A well-known buck/boost circuit can be used to provide a selected voltage to a DC link. This power, when available, can be delivered to an electrical grid by conditioning the unregulated DC power using well-known power electronics. The power electronics are sized to provide the maximum wind turbine output power to the grid which occurs when the wind is blowing at its maximum expected velocity. As can be appreciated, the power electronics are not utilized full time, for example when the wind is blowing lightly or not at all. In the present invention, a bank of internal combustion engines whose shaft power is converted to electrical output via generators and optionally an energy storage pack is connected electrically to the DC link between the active rectifier and the power electronics. These engines provide DC power to the DC link to make up for any deficit from the wind turbines so that maximum power may be provided full time, if required, to the grid. This will transform an intermittent renewable wind power facility to a reliable dispatchable power facility. As will be discussed below, the optional energy storage (for example, a battery pack, bank of flywheels, a capacitor bank or the like) and spare engines can be included to provide a spinning reserve capability.

When wind power generation is at a maximum, all the power is provided by the wind turbine renewables. For example, if this is a 9 MW rated power plant and the desired DC bus voltage is 750 volts, the full power is achieved when the wind turbine output is 12,000 amperes. The wind turbine output current can be monitored by current sensors or inferred by other well-known means and if the current falls below this level, then one or more engines can be activated and engaged to provide power to the DC link in order to bring the current back up to full power (12,000 amperes in the present example). If the engine requires a start-up period, the current deficit can be made up, at least for short periods, by an energy storage system such as a battery pack. When all the engines are engaged, they can provide full power (9 MW in this example) which would be required for example when the wind is not blowing. If the grid requires less than maximum power, the number of engines engaged on the DC link can be reduced as required.

It is noted that, as in a solar facility, the optimum operating point of the wind turbines in a wind farm is determined by a Maximum Power Point ("MPP") algorithm which is responsive to a given set of wind conditions (velocity, direction etcetera) and provides control of the load on the wind turbine rotor.

Figure 9:
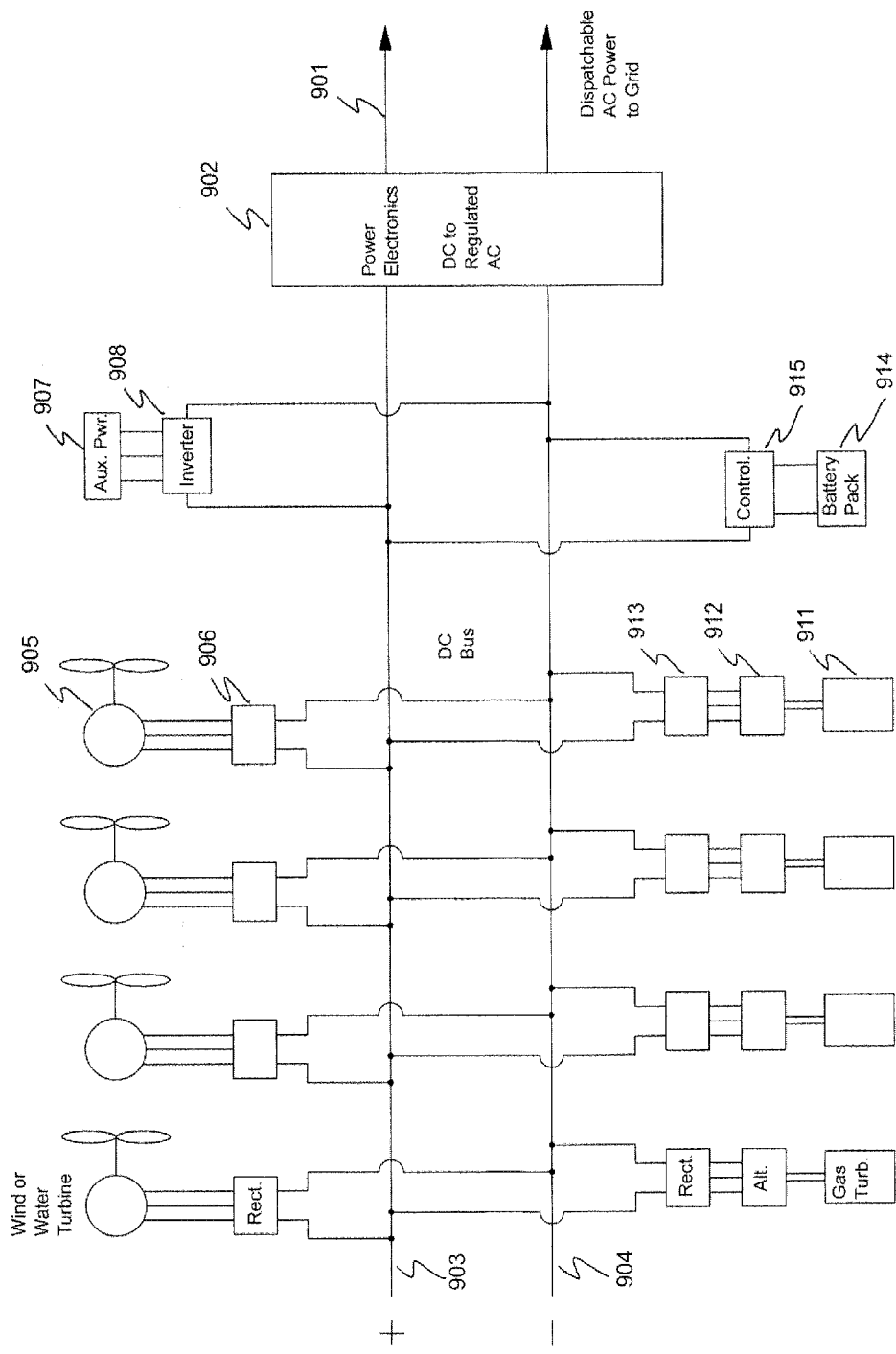
FIG. 9 is a schematic of an electrical architecture for a wind or hydro turbine power generating facility capable of providing dispatchable power to a power grid.

FIG. 9 is a schematic example of an electrical architecture for a wind or hydro turbine power generating facility of the present invention. When the wind is blowing or the water is moving (tidal or wave), energy is collected by any of a number of well-known wind or hydro turbines 905 which produce unregulated AC power. The AC power can be converted to DC electrical energy by rectifiers 906 and delivered to a DC bus (represented by positive conductor 903 and negative conductor 904) which is maintained at a selected voltage level by battery pack 914. Rectifiers 906 include diodes which prevent current from flowing back through the turbines when the DC bus voltage is higher than the output voltage of the turbines. Rectifiers 906 can be active rectifiers and can be used to control the voltage from the turbo-alternators 905. The DC power on the DC bus is then directed to a power electronics package 902 where it is converted to AC power and conditioned/regulated so that it can be delivered to a main electrical power grid when required and available. Power electronics 902 are typically very expensive and represent a significant cost component of a wind or hydro turbine power generating facility. FIG. 9 also shows an auxiliary AC power supply 907 which derives its power from the DC bus via an inverter 908.

The components describes above form a renewable wind or hydro power generating facility with a peak power output capacity of X megawatts where X is in the range of about 1,000 watts (a home solar power supply) to about 10 megawatts or more (a power generating station supplying a major power grid). The above renewable wind or hydro power generating facility can only provide power to the grid when it the wind is blowing or water is moving and so cannot provide dispatchable power (power on demand).

When a bank of engines 911 are attached to the DC bus, the engines can be turned on as needed to make up any energy/power deficit caused by the wind or water flow diminishing or by cessation of wind or water motion. These engines 911 require a source of fuel such as, for example, diesel, bio-diesel, natural gas, hydrogen, ethanol, methanol, butanol and the like. The fuel for the engines is typically, but not always, from a non-renewable energy source. The engines are attached to the DC bus via alternators 912 and rectifiers 913. Rectifiers 913 are required so that power cannot flow back through alternators 912 from the DC bus. If the wind or hydro turbine power generating facility has a peak power output capacity of X megawatts, then the total peak power rating of the bank of engines 911 must also be about X megawatts in order for the power output from the generating station to be constant when there is a deficit of incoming wind or hydro energy or no wind or water motion at all. There may be one engine or there may be many engines attached to the DC bus. In a home wind or hydro turbine power supply, one engine may be all that is required. In a large wind or hydro turbine power generating facility, the advantage of a number of engines is that only some need be activated if there is a deficit of incoming wind or hydro energy such as might occur when the wind diminishes or stop, or the tide/waves diminish. As can be appreciated, all the engines would be activated to maintain full generating power capacity during calm days or calm seas.

The battery pack 914, which is used to stabilize the DC bus voltage, can also be used to provide power to the bus when engines are being started up or when there are short-lived deficits in turbine power input to the DC bus. The battery pack 914 can be charged when there is a surfeit of power on the DC bus, whether from the incoming solar power; from one of more of the engines 911, or from the grid. The battery controller 915 allows and controls the bidirectional flow of energy to and from battery with respect to the DC bus. This control device is required if the voltage on the DC bus can not be controlled to adequately to allow the safe and satisfactory ebb and flow of current in and out of the battery.

As can be appreciated, the battery pack can be replaced by any other form of energy storage system capable of provided very rapid power response such as, for example, a bank of flywheels. It is also possible to implement the present invention without an energy storage system by always having at least one engine idling on stand-by duty.

If configured for dispatchable power without need for immediate spinning reserves (that is spinning reserves that can come on-line within 1 or 2 cycles of the AC frequency required by the grid), an energy storage system, such a battery pack 914, need not be included.

An advantage of the above architecture is that the engines can be attached to the DC bus with a minimum of additional electronics (each is provided with its own alternator and rectifier) and the power electronics 902 of the wind or hydro turbine power generating facility need not be changed or upgraded. For example, engines with a power rating of in the range of about 500 kW can be vehicle or industrial engines with commonly available, low-cost, generators.

Consider the example of a 4 MW power generating facility. The rated wind or hydro turbine power output of all the turbines is about 4 MW and the rated power output of all the engines should also be about 4 MW. If 500 kW engines are utilized, then at least 8 engines 911 would be required. Nine engines would be preferable, with the extra engine serving as a back-up. If 250 kW engines are utilized, then at least 16 engines 911 would be required with a possible additional engine for backup.

The power generating facility of FIG. 9 would thus be capable of producing full power at all times and would thus be dispatchable power that could be sold to a main power grid at dispatchable power rates ($ per MW). Dispatchable power typically commands a higher selling price than non-dispatchable power. The advantage of this configuration is that a substantial fraction of the energy output (about 25% to about 50%) can be from a renewable source even if the engines are operated on fossil fuels.

If the engines can be operated on natural gas (such as, for example, gas turbine engines), then the reduction in greenhouse gases can be substantial. Ultimately, the engines can be operated on hydrogen and this would make the entire power plant CO2 free. If the engines are operated on renewable bio-fuels, this would make the entire power plant fully available and renewable.

Spinning Reserve Configuration

For a power generating facility of the present invention with rated capacity of X MW, the rated power can be reduced to 0.80×, for example, so that it can maintain 0.20× of spinning reserves. The engines, which would have a rapid start capability, and can optionally be combined with an appropriately sized battery pack to allow the 0.20× of spinning reserves to be brought on line rapidly as required by the power grid being served.

In one configuration, the power generating facility of the present invention with rated capacity of X MW can include a number of additional engines so that the total engine power capacity is 1.25×, for example. These additional engines, which can serve as backups for underperforming or faulty engines allows the 0.25× of spinning reserves to be brought on line within a few minutes as spinning reserves as required by the power grid being served.

In another configuration, the power generating facility of the present invention with rated capacity of X MW can include a number of additional engines so that the total engine power capacity is 1.25×, for example. These additional engines, which can serve as backups for underperforming or faulty engines, along with an appropriately sized battery pack, allows the 0.25× of spinning reserves to be brought on line instantaneously (within a very short time frame measured in 1 or 2 cycles at the AC power frequency) as required by the power grid being served.

In either configuration, the facility can include enough energy storage capacity to recover energy from the main power grid to replenish or further augment spinning reserve capacity. AC grid power can be returned to the DC bus, for example, by means of a rectifier apparatus. Energy returned from the main power grid can be stored in any number of ways, including flywheel storage, compressed air storage, pumped hydro storage, electrical storage in a large battery pack or in thermal storage such as for example a large carbon block. The energy from the latter can be recovered via heat exchanger to operate a closed or open cycle gas turbine or combined cycle turbine facility.

It is noted that if a battery pack or capacitor bank is used for energy storage along with a number of engines to convert an intermittently available renewable power plant into a fully available dispatchable power plant with spinning reserves, then this configuration along with the power electronics that convert DC power to regulated AC power for the grid can provide reactive volt-ampere ("VAR") control.

Combined Cycle Power Plant

As can be appreciated, the exhaust from the engines can be collected and used to power a combined cycle power plant. For example, the exhaust from recuperated gas turbines is in the range of about 130 C to about 275 C. The collected exhaust gases can be used to drive a well-known heat recovery generator facility which would include at least one of: a Rankine cycle generator (steam or organic Rankine cycle); a Brayton cycle generator; a thermoelectric generator; any combination of these which can be configured to deliver electrical output to the DC bus of the present invention.

Storage of Excess Energy from Renewables

From time to time, there will be less demand for power than can be provided by the renewables. There are well-known ways to store excess energy such as in large battery packs, a system of flywheels, pumped storage etcetera). With the present invention, this excess energy can be used to power a reverse fuel cell or electrolysis facility to produce fuels such as hydrogen. In the case of hydrogen, it can be stored as a low-pressure compressed gas, for example, and used by the engines when the facility is required to produce more power than can be supplied by the renewables. For example, in the preferred engine (a gas turbine), the hydrogen can be added to the gas flow prior to the combustor (at the inlet or anywhere upstream of the combustor) to supplement the fuel currently being used. Another alternative is to use excess generation to produce hydrogen and then add the hydrogen to stored natural gas. It is well-known that hydrogen can be added to natural gas to form a stable mixture containing up to about 25% hydrogen.

Dispatchable Power from a Large Wind Turbine

In a prior art wind turbine power generator capable of generating power in the range of up to about 8 megawatts, typical components in the nacelle include a large rotor that typically turns a low-speed shaft which transmits power via a gear box to a high speed shaft that drives an electrical generator. A controller controls the wind turbine's blade pitch, yaw, brake, and generator. Most of the early wind turbine generators are asynchronous induction generators with squirrel cage rotors. When this generator (4 poles) goes above about 1,800 rpm, the generator generates power when connected to a 60 Hertz grid. The control for this type of generator would be a simple contactor when it connects and disconnects at certain speeds. The power control for this generator is its speed which is controlled by blade pitch and lastly by the wind turbine's yaw control. More recently power electronics that condition and regulate the power to be compatible with an electrical grid have been used with asynchronous induction generators and permanent magnet synchronous generators to have a greater efficiency because this approach has a better yield of kW-hours for a given size wind turbine. Such large wind turbines are a substantial source of renewable electrical energy but are dependent on the strength and duration of the wind for power output. They are thus not a reliable source of dispatchable power.

Figure 10:
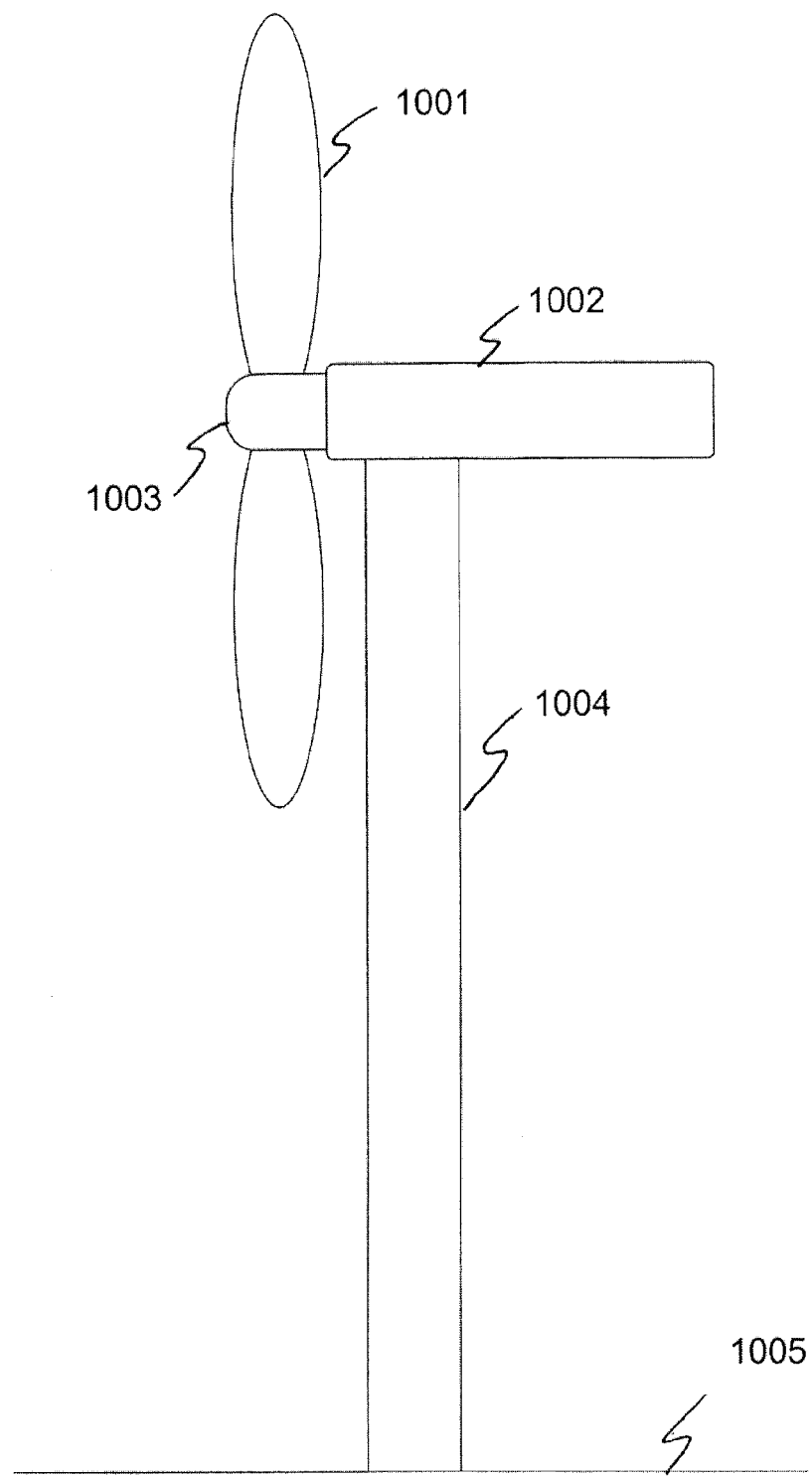
FIG. 10 is a schematic of the principal components of a large wind turbine.

FIG. 10 is a schematic of the principal components of a large wind turbine. The wind turbine rotor is comprised of variable pitch blades 1001 attached to a hub 1003. The mechanical power of the rotor is typically converted to conditioned electrical power in nacelle 1002. The conditioned power may be transmitted down tower 1004 and connected to the main electrical grid near the base of the tower 1004 which may be anchored into the ground or into the sea-bed 1005. Alternately, the electrical power generated in nacelle 1002 may be transmitted down tower 1004 via a DC or AC power link to power conditioning equipment located in the base of tower 1004.

Figure 11:
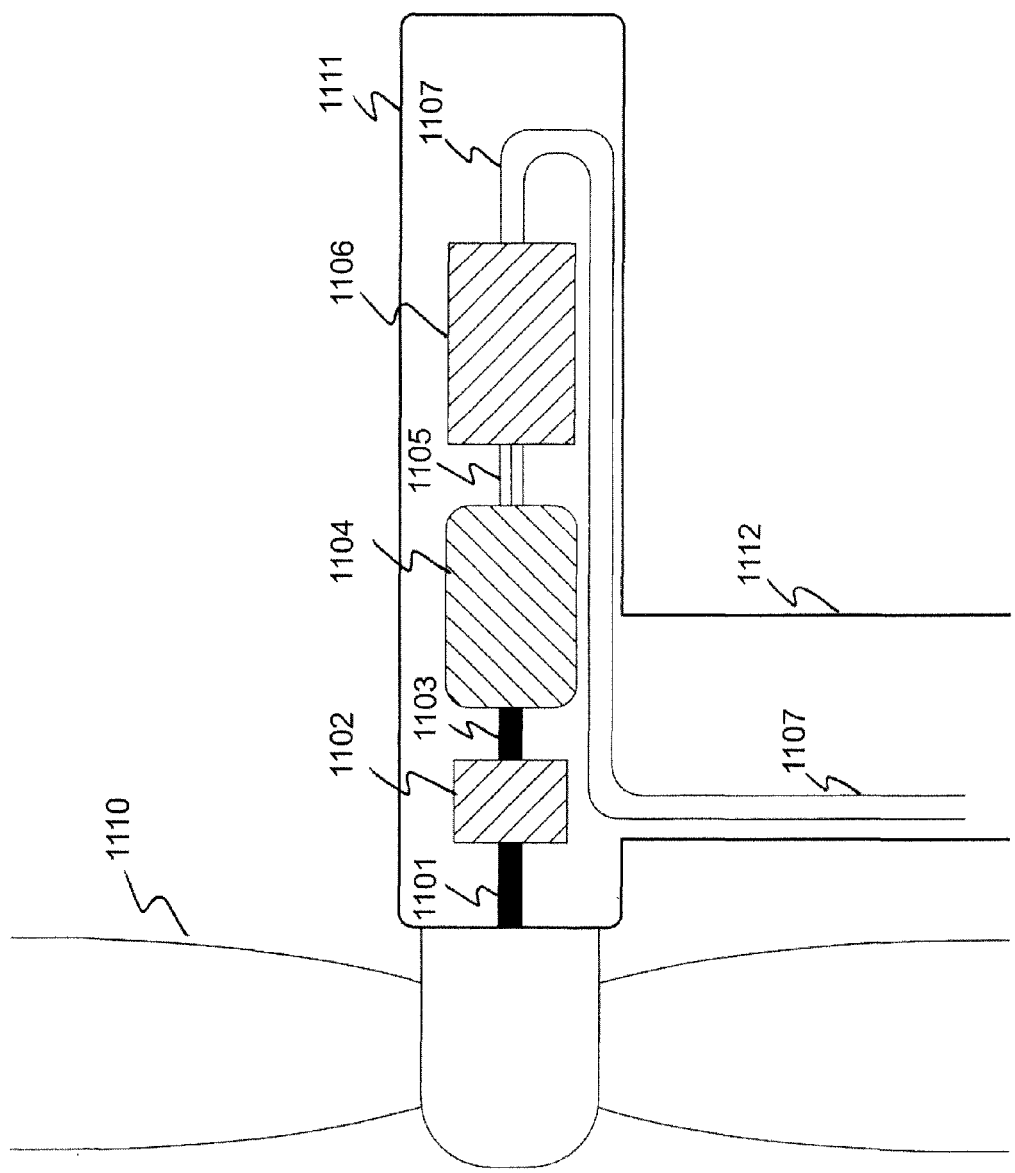
FIG. 11 is a schematic of the upper portion of a large wind turbine compatible with back-up power.

FIG. 11 is a schematic of the upper portion of a large wind turbine compatible with incorporating a back-up power capability. In this configuration, mechanical power from the rotor 1110 is transmitted via low speed shaft 1101 to gear box 1102 which drives high speed shaft 1103. High speed shaft 1103 drives generator 1104, which outputs AC power to active rectifier apparatus 1106. DC power is transmitted onto DC bus 1107. Low speed shaft 1101, gear box 1102, high speed shaft 1103, generator 1104 and active rectifier 1106 are contained in nacelle 1111. DC link 1107 transfers electrical power down tower 1112 to additional equipment located at or near the base of tower 1112.

Figure 12:
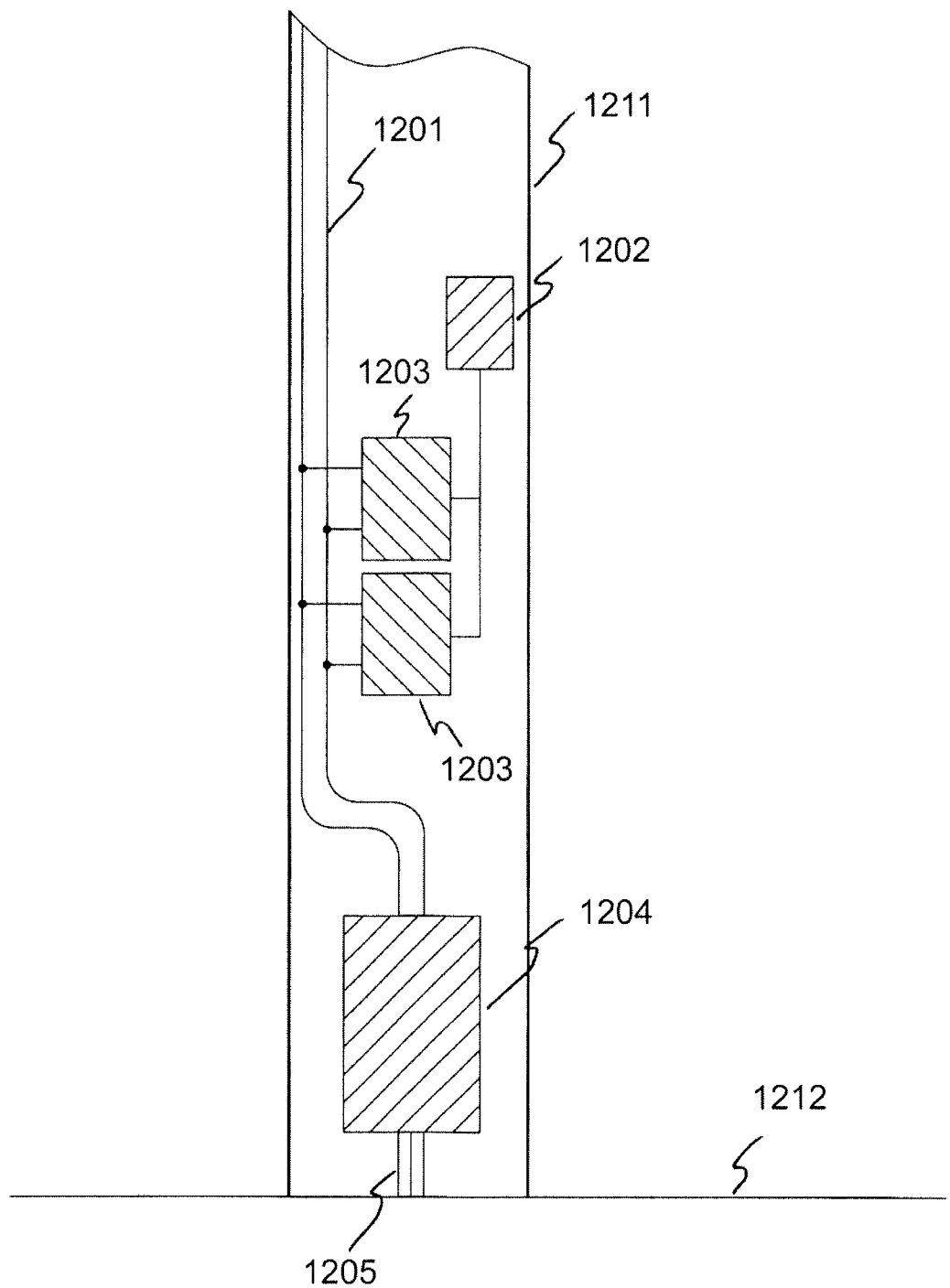
FIG. 12 is a schematic of the lower portion of a large wind turbine compatible with back-up power.

FIG. 12 is a schematic of the lower portion of a large wind turbine compatible with incorporating a back-up power capability. DC link 1201 is connected to power conditioning equipment 1204 which conditions the power for external electrical grid 1205. In addition, one or more engine modules 1203 are connected to DC link 1201 and are available to add DC electrical power to DC link 1201 as needed. Engine modules 1203 are controlled by engine controller 1202. An example of a layout of engine modules 1203 have been described previously in detail in FIG. 9.

As can be appreciated, the engine modules can be located in the nacelle 1111 of the wind turbine or anywhere in the tower 1211 of the wind turbine. Electrically, the engine modules input their DC power onto DC link 1201 which connects the active rectifiers on the output of the electrical generator to the power conditioning equipment 1204 which is connected to an external electrical grid.

As can be appreciated, the engines and power electronics can be located in the nacelle, in the tower or in a building adjacent to the tower within a reasonable distance. This latter option is more likely for land-based wind turbines.

The engine modules 1203 thus allow the wind turbine facility to be operated as a supply of fully available dispatchable power as discussed in FIG. 11. As discussed in FIG. 11, additional engines may be included along with an energy storage system such as, for example, a battery pack to provide a spinning reserve capability. This configuration of wind turbine and engines allow the power generating facility to maintain its rated (or nameplate) power rating, independent of wind conditions. If there are back-up engines and/or an energy storage capability, the configuration then has a spinning reserve capability. Turning such a wind turbine facility into a fully available dispatchable power facility with spinning reserve capability does not require additional expensive power electronics since the back-up power is added onto the DC link.

Control of Wind Turbine DC Bus Voltage

Figure 13:
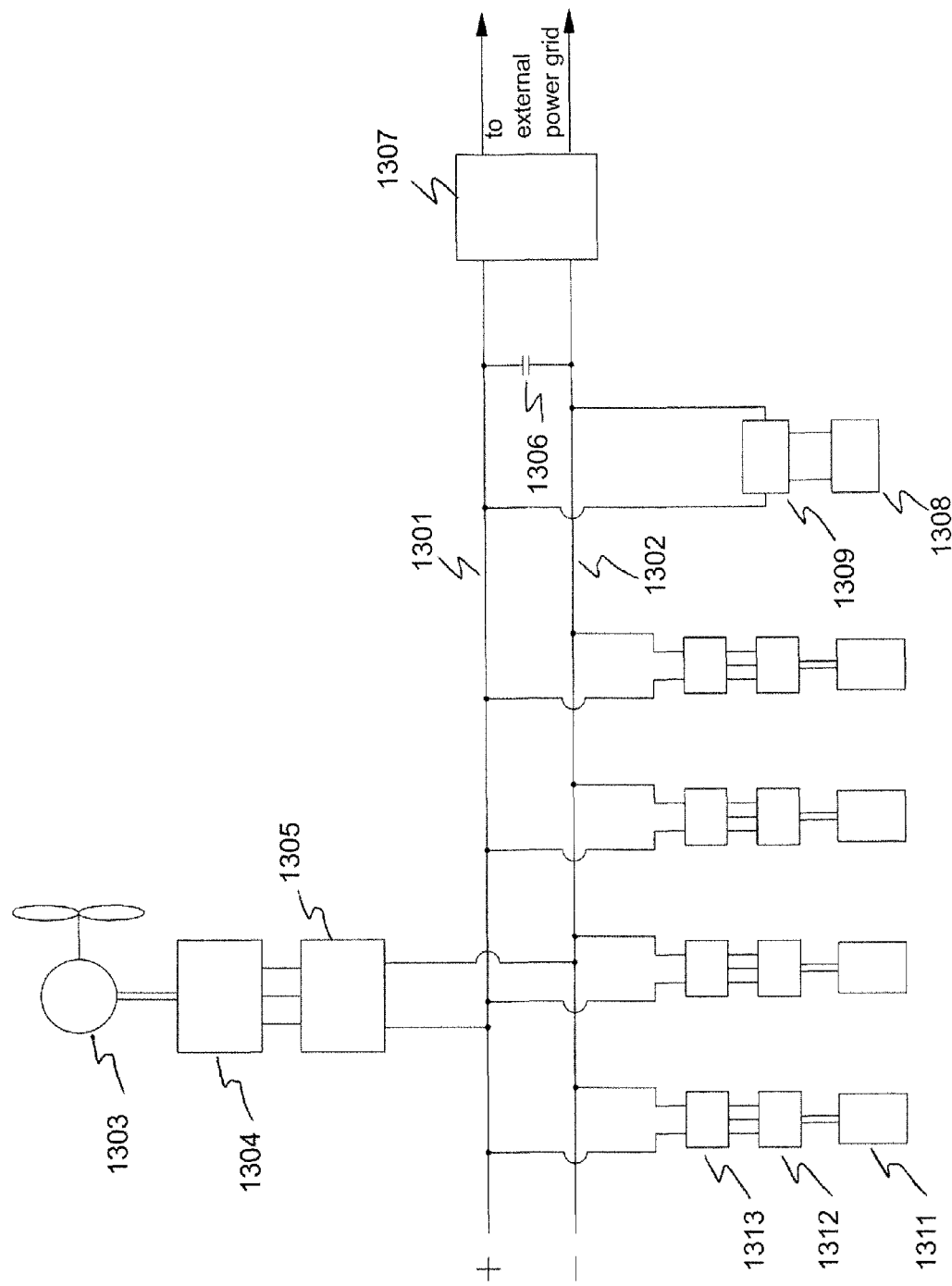
FIG. 13 is a schematic of an electrical architecture for a large wind turbine.

FIG. 13 is a schematic example of an electrical architecture for a large wind turbine. A large wind turbine 1303 drives a generator 1304. The output of the generator 1304 goes through an active rectifier 1305 and generates DC power onto a DC bus formed by positive conductor 1301 and negative conductor 1302. Generator 1304 may by a permanent magnet machine, a switch reluctance machine, a synchronous or non-synchronous generator or the like. A bank of engines 1311 are connected in parallel to the DC bus, each via alternators 1312 and rectifier circuits 1313. Rectifier circuits 1313 may be active or passive rectifier circuits. An electrical energy storage system 1308 is connected to DC bus via a buck/boost circuit 1309. The energy storage system 1308 may be a battery pack, a capacitor bank or a flywheel system for example. A large capacitance 1306 is connected across the DC bus. The output of the DC bus is directed to a power electronics package 1307 which transforms the DC voltage to a regulated AC voltage suitable for an external electrical grid.

Power electronics 1307 are sized for the full rated power output of the wind turbine 1303 when the wind turbine 1303 is generating at its maximum power. This maximum or rated output power is typically in the range of about 1 MW to about 10 MW. When the wind is blowing lightly or not at all, then enough engines 1311 are turned on to generate sufficient additional power to make up the difference between the power output of wind turbine 1302 and the maximum rated power of the facility. As can be appreciated, the number and power rating of the engines should be such that all the engines can at least generate the full power rating of the facility. As an example, if the rated power output of the facility is 8 MW and the engines are rated at 400 kW each, then 20 engines would be required to generate full power when little or no wind is blowing. Two or 3 additional engines may be provided in the event an engine goes down for service or if a spinning reserve capacity is required.

The energy storage unit 1308 is used for a variety of functions. It can be used to stabilize the DC bus voltage within selected limits, for example between 400 and 800 volts. It can be used to provide instant power for the period when an engine or engines are being started up to when they are outputting full power. For a 400 kW gas turbine engine, this start-up period is typically in the range of about 30 seconds to about 2 minutes.

Figure 14:
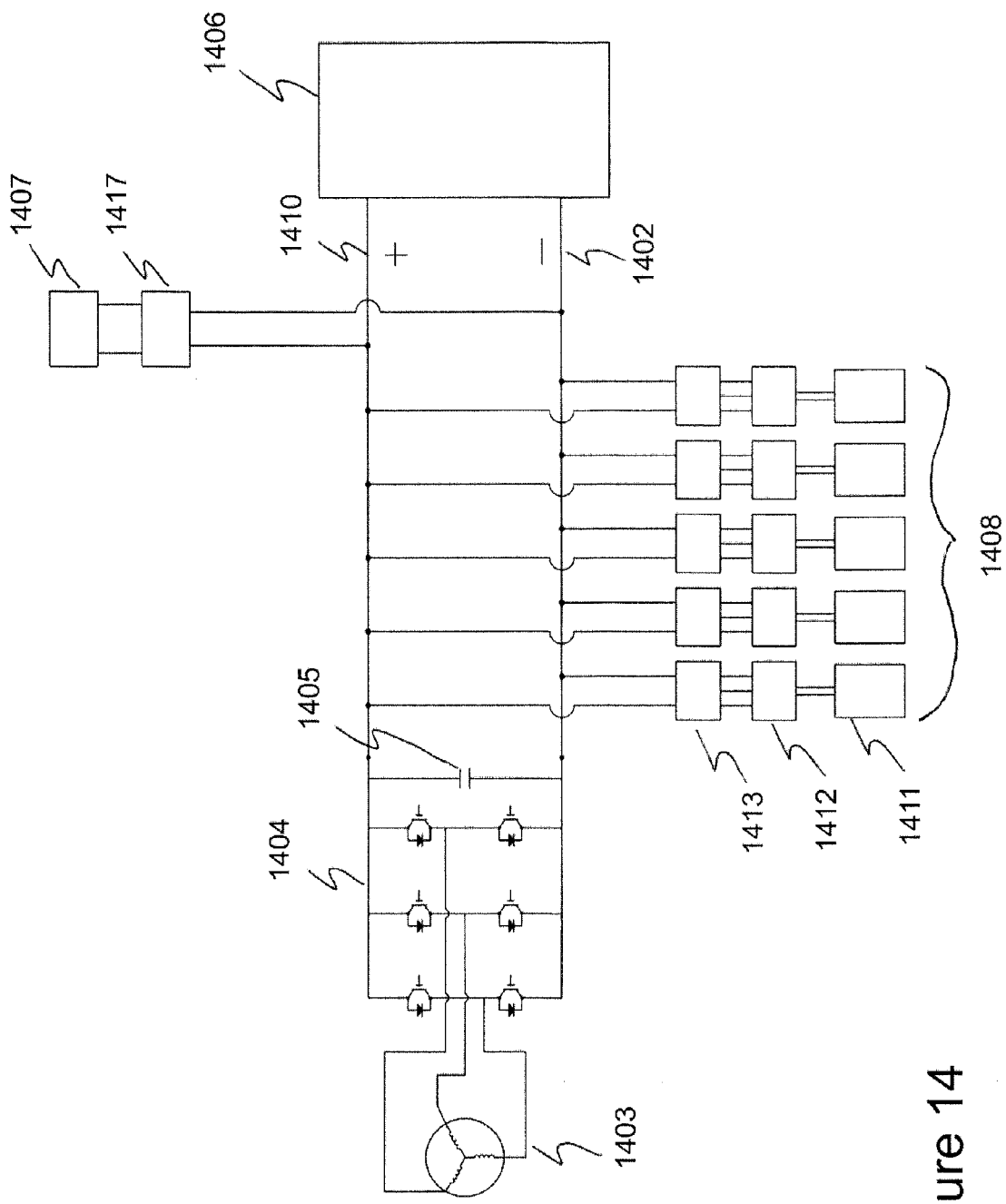
FIG. 14 is a schematic of an electrical architecture for a large wind turbine showing an active rectifier.

FIG. 14 is a schematic of an electrical architecture for a large wind turbine showing an active rectifier. The output of generator 1403 goes through an active rectifier 1404 which is formed by six independently operable IGBTs (Insulated Gate Bipolar Transistors). As can be appreciated, each independently operable IGBT may be comprised of two or more IGBTs in parallel to provide the necessary current carrying capacity. Generator 1403 and active rectifier 1404 output DC power onto a DC bus formed by positive conductor 1401 and negative conductor 1402. A large capacitor is shown across the output of the active rectifier network. This capacitance, the inductance of the windings of generator 1403 windings and the IGBT network form a boost circuit for the output of generator 1403 when its voltage drops below the desired DC bus voltage when the wind turbine rotor speed decreases below an acceptable value.

Generator 1403 may by a permanent magnet machine, a switch reluctance machine, a synchronous or non-synchronous generator or the like. A bank of engine systems 1408 are connected in parallel to the DC bus, each engine 1411 via alternator 1412 and rectifier circuit 1413. Rectifier circuits 1413 may be active or passive rectifier circuits. An electrical energy storage system 1407 is connected to DC bus via a buck/boost circuit 1417. The energy storage system 1407 may be a battery pack, a capacitor bank or a flywheel system for example. The output of the DC bus is directed to a power electronics package 1406 which transforms the DC voltage to a regulated AC voltage suitable for an external electrical grid.

The control of output power to the external grid can be viewed from two perspectives.

The first perspective is to control the flow of power from the wind turbine rotor and the engines by regulating the DC bus voltage so as to maximize power transfer from the wind turbine and engines to the external electrical grid. As is well-known, power and voltage from the wind turbine can be controlled to an extent by orientation of the rotor to the wind (yaw) and pitch of the rotor blades. The engines can be controlled to deliver power to the DC bus at a selected voltage. The active rectifier buck/boost circuit on the output of the wind turbine generator can be controlled by its IGBTs to keep power flowing onto the DC bus as the rotor speed changes. Additional control is provided by the power electronics that provide properly regulated AC waveforms and power to an external grid. These electronics are typically installed when the wind turbine is constructed and are sized to output the full rated power of the wind turbine.

The second perspective is to determine if the external grid requires power and whether it is economical for the wind turbine facility to provide this power. For example, if the price of providing power to the grid is less than the cost of fuel for the engines, then it would not be economical to provide power to the grid, except by the wind turbine.

Preferred Engine

As can be appreciated, any type of prime mover (for example, any internal combustion engine or a fuel cell) can be used in the above dispatchable power configurations. Diesel engines are commonly used for distributed, peaking (load shedding) and/or back-up power purposes. A preferable engine type is a high-efficiency gas turbine engine because it typically has lower NOx emissions, is more fuel flexible and has lower maintenance costs. For example, an intercooled recuperated gas turbine engine in the 10 kW to 650 kW range is available with thermal efficiencies above 40%.

Figure 15:
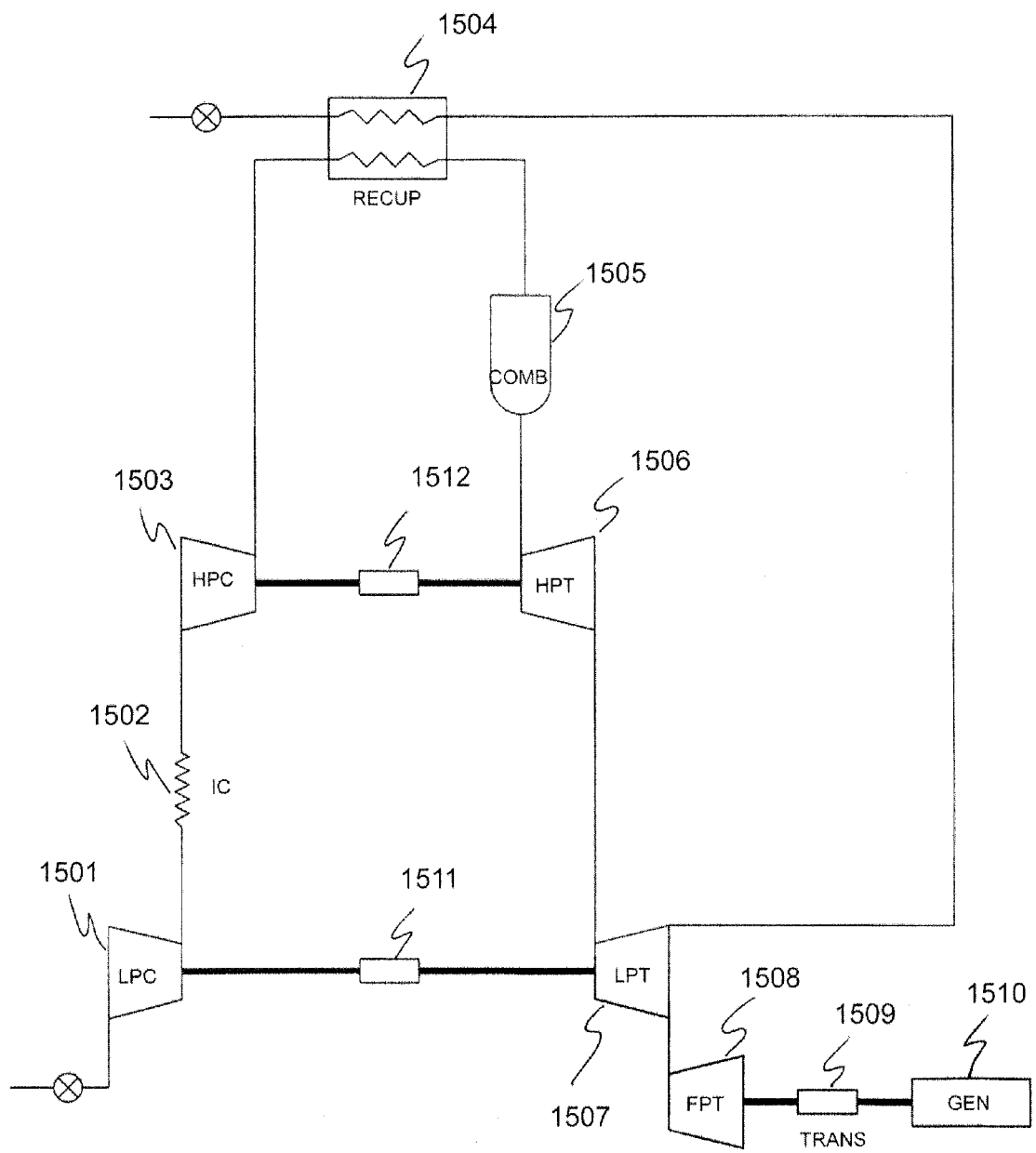
FIG. 15 is schematic of an intercooled, recuperated gas turbine engine for providing DC electrical power to a DC bus.

An example of such an engine is described in FIG. 15. The preferred fuel is a bio fuel or other renewable fuel such as for example hydrogen. Natural gas or methane is a preferred fossil fuel. It is possible to site a renewable energy facility over or near to a landfill facility so that the landfill gas, which is a non-fossil fuel, can be utilized to run the engines of the present invention.

FIG. 15 is a schematic of an intercooled, recuperated gas turbine engine cycle. This configuration of gas turbine components is known. Gas is ingested into a low pressure compressor (LPC) 1501. The outlet of the low pressure compressor 1501 passes through an intercooler (IC) 1502 which removes a portion of heat from the gas stream at approximately constant pressure. The gas then enters a high pressure compressor (HPC) 1503. The outlet of high pressure compressor 1503 passes through a recuperator (RECUP) 1504 where some heat from the exhaust gas is transferred, at approximately constant pressure, to the gas flow from the high pressure compressor 1503. The further heated gas from recuperator 1504 is then directed to a combustor (COMB) 1505 where a fuel is burned, adding heat energy to the gas flow at approximately constant pressure. The gas emerging from the combustor 1505 then enters a high pressure turbine (HPT) 1506 where work is done by the turbine to operate the high pressure compressor 1503. The gas from the high pressure turbine 1506 then drives a low pressure turbine (LPT) 1507 where work is done by the turbine to operate the low pressure compressor 1501. The gas from the low pressure turbine 1507 then drives a free power turbine (FPT) 1508. The shaft of the free power turbine 1508, in turn, drives a transmission (TRANS) 1509 which drives an electrical generator (GEN) 1510.

The low pressure compressor 1501 is coupled to the low pressure turbine 1507 by shafts which may be coupled by a gear box 1511. Alternately, the low pressure compressor 1501 may be coupled to the low pressure turbine 1507 by a single shaft. The high pressure compressor 1503 is coupled to the high pressure turbine 1506 by shafts which may be coupled by a gear box 1512. Alternately, the high pressure compressor 1503 may be coupled to the high pressure turbine 1506 by a single shaft.

The advantages of this engine compared to, for example, a diesel engine of similar power rating is that the gas turbine engine is characterized by substantially lower NOx emissions, lower fuel consumption when the thermal efficiency is above about 40%, ability to burn multiple fuel types (fuel flexible), less sensitivity to fuel properties (fuel tolerance), lower operating costs and higher power density. For example, a gas turbine engine can burn bio-fuels as well as various natural gas mixtures and hydrogen.

When these engines are in the power range of about 300 kW to about 700 kW, they can be started and brought up to full power in a few minutes. Thus they can be used to provide a spinning reserve capability when the spinning reserves are required within about 5 to 10 minute period of demand (depending on power provider jurisdiction).

Business Aspects of the Present Invention

An electrical grid is comprised of (1) primary generating plants (large coal-fired, gas-fired, nuclear, wind, solar etcetera), (2) a high voltage transmission corridor, (3) a number of distribution networks receiving electricity from the high voltage transmission corridor and (4) local utility companies who supply the users of electricity in the region served by the distribution network. As the grid is expanded to include distributed generation ("DG") sources connected to the distribution network and demand response capability ("DR"), the problems of balancing the grid become more difficult primarily because of an increasing number of intermittently available renewable generating plants, both on the primary generating side and the distribution side of the high voltage transmission system. DG sources typically include for example small gas-fired plants, wind and solar farms.

As far as the managing utility is concerned, it is purchasing energy (kW-hrs) from intermittently available renewable generating plants whereas it is purchasing grid power capacity (kW) from fully available, dispatchable power plants. The price paid for reliable, dispatchable power is usually considerable higher than the price paid for intermittently available energy capacity (kw-hrs).

In the present invention, generating plants based on intermittent renewable power generating facilities may be upgraded to become dispatchable power facilities or dispatchable power facilities with spinning reserves. If the engines that comprise a part of the present invention use fossil natural gas as a fuel, they reduce the carbon dioxide emissions typical of diesel engines operating on fossil diesel fuel for example. Further, if the engines that comprise a part of the present invention use methane recovered from waste landfills, waste treatments plants and other opportunity sources of non-fossil natural gas, then the entire facility becomes carbon dioxide neutral. Ultimately, if the engines that comprise a part of the present invention use hydrogen gas, provided for example from a nuclear power plant, then the entire facility becomes carbon dioxide free.

The present invention can thus have the following financial advantages to the power plant when installed in an intermittently available renewable power facility:

1. Increases the utilization factor of the inverter power electronics from no greater than about 30% to up to about 100%, thus making the renewable power plant a much better capital investment
2. Increases the price received per kilowatt generated as the power is now fully available dispatchable with spinning reserves.
3. When the engines are run on fossil natural gas, the plant will be subject to a carbon tax or carbon debit (in a cap and trade system) whose cost would be more than covered by the increased price received for dispatchable power with spinning reserves.
4. When the engines are run on non-fossil natural gas or bio-fuels, the plant will be carbon dioxide neutral and almost certainly not subject to a carbon tax or carbon debit.

5. When run on hydrogen or other non-carbon fuel, the plant will be carbon dioxide free and not subject to any carbon tax or carbon debit.
6. By being fuel flexible, the power plant will require no significant capital outlays to convert to new fuels as they become available or mandated.

The present invention can also have the following financial advantages to the grid when installed in an intermittent renewable power facility:
1. Adds reliability to the grid by turning intermittently available power generation facilities into fully available dispatchable power facilities.
2. Eliminates the need for additional spinning reserves provided by other power plants on the grid
3. Reduces the need for additional generating capacity whether on the power generating side or distribution side of the high voltage transmission corridor.

A number of variations and modifications of the inventions can be used. As will be appreciated, it would be possible to provide for some features of the inventions without providing others.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of converting a renewable power plant to a dispatchable power plant, comprising:
    providing a computer system with a processor;
    providing at least one intermittently available renewable energy source;
    providing at least one fully available energy source;
    providing a DC bus;
    wherein the at least one intermittently available renewable energy source is associated with an existing power electronics interface that connect the DC bus to a regulated AC power grid, the existing power electronics interface adapted to transform DC voltage to regulated AC voltage;
    converting power from the at least one intermittently available renewable energy source to DC power on a DC bus;
    the processor accessing whether the power delivered by the at least one intermittently available renewable energy source will be less than a predetermined amount of power;
    operating the at least one fully available energy source to supply sufficient DC power to the DC bus to supply an amount of power requested by a regulated AC power grid up to the maximum rated power of the at least one intermittently available renewable energy source; and
    supplying the power requested by the regulated AC power grid utilizing the existing power electronics interface, wherein the at least one fully available energy source is only associated with the existing power electronics interface as the existing power electronics interface are capable of carrying the maximum rated power of the at least one intermittently available renewable energy source.

2. The method of claim 1, wherein the at least one fully available energy source provides dispatchable power, wherein each of the at least one fully available energy source comprises at least one of a gas turbine engine, a reciprocating engine and a fuel cell, and power control apparatuses to provide DC electrical power to a DC bus.

3. The method of claim 1, wherein the at least one intermittently available energy source is at least one of a photovoltaic array, a solar thermal plant, a wind turbine and a water turbine, wherein the predetermined amount of power is an existing or probable electrical power requirement by the AC power grid.

4. A non-transitory computer readable medium comprising processor executable instructions to perform the steps of claim 1.

5. A system for converting a renewable power plant to a dispatchable power plant, comprising:
    a DC bus;
    at least one available renewable energy source electrically connected to the DC bus, wherein output power of the at least one renewable energy source is convertible to DC power;
    an existing power electronics interface connecting the DC bus to a regulated AC power grid wherein the existing power electronics interface is capable of carrying the maximum rated power of the at least one renewable energy source, the existing power electronics interface associated with the at least one available renewable energy source;
    at least one fully available energy source also interconnected to the existing power electronics interface, the output power of the at least one fully available energy source is convertible to DC power by the existing power electronics interface; and
    wherein the power on the DC bus is regulated by the existing power electronics interface so as to maintain a requested power level by the grid up to the maximum rated power of the at least one renewable energy source.

6. The system of claim 5, wherein the at least one fully available energy source comprises a prime power source, wherein the at least one fully available energy source provides dispatchable power, and wherein the at least one fully available energy source comprises a power control apparatus to provide DC electrical power to a DC bus.

7. The system of claim 6, wherein the at least one available renewable energy source is at least one of a photovoltaic array, a solar thermal plant, a wind turbine and a water turbine, wherein the requested power level is an existing or probable electrical energy requirement by the AC power grid.

8. The system of claim 5, further comprising:
a processor operable to set an energy storage system power control apparatus voltage to a level sufficient to send electrical energy from an energy storage system to the DC bus and set at least one fully available energy source power control apparatus voltages to a level sufficient to send electrical power from the at least one fully available energy source to the DC bus.

9. The system of claim 8, wherein the processor engages and/or adjusts a determined amount of power from the at least one fully available energy source required to provide sufficient electrical energy to the grid to satisfy the requested power level and, as the at least one fully available energy source supplies the requested power level, adjusts the energy storage system power control apparatus voltage to a lower first level to decrease an amount of electrical power supplied by the energy storage system to the DC bus.

10. The system of claim 9, wherein the processor is operable to set an energy storage system power control apparatus voltage to a level sufficient to charge an energy storage system.

11. The system of claim 5, further comprising:
a wind turbine comprising a rotor to rotate in response to air movement and produce mechanical power;
a generator operable to convert the mechanical power into alternating current AC electrical energy; and
a power control apparatus operable to convert the AC electrical energy into direct current ("DC") electrical energy that is forwarded to the DC bus.

12. The system of claim 11, wherein the at least one fully available energy source is located in a nacelle of the wind turbine.

13. The system of claim 11, wherein at least one fully available energy source is located in a tower of the wind turbine.

14. The system of claim 11, wherein at least one fully available energy source is located adjacent to a tower of the wind turbine.

15. The method of claim 1 wherein the DC bus receives electrical power from at least one of the at least one fully available energy source and at least one intermittently available renewable energy source, and further comprising providing power to an inverter, the inverter converting the DC electrical power to an AC electrical power for supply to the regulated AC power grid.

16. The method of claim 1, further comprising providing at least one DC energy storage device, and supplying power from the at least one DC energy storage device to the DC bus.

17. The method of claim 16, further comprising:
setting an energy storage system power control apparatus voltage to a level sufficient to send electrical power from an energy storage system to the DC bus; and
setting the at least one fully available energy source's power control apparatus voltages to levels sufficient to send electrical energy from the one or more fully available energy source to the DC bus.

18. The method of claim 17, further comprising:
engaging and/or adjusting a determined amount of power from the at least one fully available energy source required to provide sufficient electrical power to the grid to satisfy the determined amount;
as the at least one fully available energy source supplies the predetermined amount of power, adjusting the energy storage system power control apparatus voltage to a lower first level to decrease an amount of electrical power supplied by the energy storage system to the DC bus.

19. The system of claim 5, wherein the at least one fully available energy source provides an aggregate power output substantially equal to the maximum rated power of the at least one renewable energy source.

20. The system of claim 5, wherein the at least one DC energy storage source is connected to the DC bus.

21. The system of claim 5, wherein the DC bus is electrically connected to an inverter.

22. The method of claim 1, further comprising an energy storage system that supplies energy to the DC bus to reduce the amount of power required by the at least one fully available energy source.

23. The method of claim 22, wherein the energy storage system can be charged by the at least one intermittently available energy source.

24. The method of claim 23, wherein an amount of power being requested by the AC power grid is less than that available from the at least one intermittently available energy source.

25. The method of claim 22, wherein the energy storage system can call for more power than the intermittent source can provide.

26. The method of claim 22, wherein the energy storage system provides power while the at least one fully available energy sources are preparing to provide power.

27. A system for converting a renewable power plant to a dispatchable power plant, comprising:
a DC bus;
at least one available renewable energy source electrically connected to the DC bus, wherein output power of the at least one renewable energy source is convertible to DC power;
an existing power electronics interface connecting the DC bus to a regulated AC power grid wherein the existing power electronics interface is capable of carrying the maximum rated power of the at least one renewable energy source;
at least one fully available energy source, the output power of the at least one fully available energy source is convertible to DC power;
wherein the power on the DC bus is regulated by the existing power electronics interface so as to maintain a requested power level by the grid up to the maximum rated power of the at least one renewable energy source;
a wind turbine comprising a rotor to rotate in response to air movement and produce mechanical power;
a generator operable to convert the mechanical power into alternating current AC electrical energy;
a power control apparatus operable to convert the AC electrical energy into direct current ("DC") electrical energy that is forwarded to the DC bus; and
wherein the at least one fully available energy source is located in a nacelle of the wind turbine, a tower of the wind turbine, or adjacent to a tower of the wind turbine.

28. The system of claim 27, wherein the at least one fully available energy source comprises a prime power source, wherein the at least one fully available energy source provides dispatchable power, and wherein the at least one fully available energy source comprises a power control apparatus to provide DC electrical power to a DC bus.

29. The system of claim 28, wherein the at least one available renewable energy source is at least one of a photovoltaic array, a solar thermal plant, a wind turbine and a water turbine, wherein the requested power level is an existing or probable electrical energy requirement by the AC power grid.

30. The system of claim 27, further comprising:
a processor operable to set an energy storage system power control apparatus voltage to a level sufficient to send electrical energy from an energy storage system to the DC bus and set at least one fully available energy source power control apparatus voltages to a level sufficient to send electrical power from the at least one fully available energy source to the DC bus.

31. The system of claim 30, wherein the processor engages and/or adjusts a determined amount of power from the at least one fully available energy source required to provide sufficient electrical energy to the grid to satisfy the requested power level and, as the at least one fully available energy source supplies the requested power level, adjusts the energy storage system power control apparatus voltage to a lower first level to decrease an amount of electrical power supplied by the energy storage system to the DC bus.

32. The system of claim 31, wherein the processor is operable to set an energy storage system power control apparatus voltage to a level sufficient to charge an energy storage system.

33. The system of claim 27, wherein the at least one fully available energy source provides an aggregate power output substantially equal to the maximum rated power of the at least one renewable energy source.

34. The system of claim 27, wherein the at least one DC energy storage source is connected to the DC bus.

35. The system of claim 27, wherein the DC bus is electrically connected to an inverter.

36. An electrical power generating system for converting a renewable power plant to a dispatchable power plant, comprising;
at least one renewable energy source that outputs DC electrical power to a DC bus;
the DC bus and an inverter connected to an electrical utility grid wherein the DC bus and inverter transmits power to the electrical utility grid up to a rated power level of the at least one renewable energy source;
at least one back-up power source comprising an engine and a fuel supply, the at least one back-up power source outputting DC electrical power to the DC bus; and
a computer system that, based on the demand requested by the electrical utility grid, commands the requested power to be delivered to the electrical utility grid, up to the rated power level.

37. A method of converting a renewable power generating facility to a dispatchable power generating facility, comprising:
providing a DC bus and an inverter connected to an electrical utility grid;
providing at least one renewable energy source outputting DC electrical power to the DC bus;
providing at least one back-up power source comprising an engine and a fuel supply, the at least one back-up power source outputting DC electrical power to the DC bus;
providing a computer system;
determining, by the computer system, an amount of electrical power being delivered by the at least one renewable energy source to the electrical utility grid;
determining, by the computer system, the power requested by the electrical utility grid;
operating, by the computer system, the at least one back-up power source to supply power to the DC bus equal to the power requested by the electrical utility grid minus the amount of electrical power being delivered by the at least one renewable energy source, up to a rated power level of the at least one renewable energy source.

* * * * *